(12) United States Patent
Chang

(10) Patent No.: US 12,348,635 B2
(45) Date of Patent: Jul. 1, 2025

(54) SYSTEM AND METHODS FOR INTERACTIVE DOCUMENT SHARING AND AUTHENTICATION WITH PRIVACY GUARANTEE

(71) Applicant: Mingtai Chang, Los Angeles, CA (US)

(72) Inventor: Mingtai Chang, Los Angeles, CA (US)

(73) Assignee: Mingtai Chang, Los Angeles, CA (US)

( * ) Notice: Subject to any disclaimer, the term of this patent is extended or adjusted under 35 U.S.C. 154(b) by 260 days.

(21) Appl. No.: 18/079,542

(22) Filed: Dec. 12, 2022

(65) Prior Publication Data

US 2023/0188345 A1      Jun. 15, 2023

Related U.S. Application Data

(60) Provisional application No. 63/265,273, filed on Dec. 11, 2021.

(51) Int. Cl.
    *H04L 9/32*    (2006.01)
    *G06F 21/62*   (2013.01)
    *H04L 9/30*    (2006.01)

(52) U.S. Cl.
    CPC .......... *H04L 9/321* (2013.01); *G06F 21/6245* (2013.01); *H04L 9/3073* (2013.01); *H04L 9/3271* (2013.01)

(58) Field of Classification Search
    None
    See application file for complete search history.

(56) References Cited

U.S. PATENT DOCUMENTS 11,436,597 B1 *   9/2022  Griffin ............... H04L 9/3213
2013/0325728 A1 * 12/2013  Bialostok ........... G06Q 10/06
                                              705/311

(Continued)

FOREIGN PATENT DOCUMENTS

WO    WO-2015088986 A1 *  6/2015  ........... H04L 9/3228

OTHER PUBLICATIONS

Ethereum.org [online], "Ethereum," available on or before Apr. 1, 2021, via Internet Archive: Wayback Machine URL <https://web.archive.org/web/20210401054532/https://ethereum.org/en/>, retrieved on May 2, 2024, <https://ethereum.org/en/>, 16 pages.

(Continued)

*Primary Examiner* — Benjamin E Lanier
(74) *Attorney, Agent, or Firm* — Fish & Richardson P.C.

(57) ABSTRACT

This specification describes systems, methods, devices, and other techniques for a group of clients to engage in a privacy-centric discussion by exchanging private messages pseudonymously and anonymously. In the formal setting where the discussion is to negotiate an agreement or contract and to work toward a formal document agreed upon by all participants, the final concluding document or contract is to explicitly contain the identities of all participants with documentary evidence, including all participants' signature authenticated by a third-party service, to reduce mistaken identity and its adverse effect on contractual validity. Both the content of the final document and the proof of authentication for each participant remain private to the discussion group in encrypted form, decodable by those participants owning the authenticated identities. The final document can be recorded on a trustless blockchain-based repository.

14 Claims, 13 Drawing Sheets

(56) References Cited

U.S. PATENT DOCUMENTS

| | | | | |
|---|---|---|---|---|
| 2016/0035053 | A1* | 2/2016 | Gerhardt | G06F 21/64 |
| | | | | 705/316 |
| 2019/0123889 | A1* | 4/2019 | Schmidt-Karaca | H04L 9/0618 |
| 2020/0076612 | A1* | 3/2020 | Adluri | H04L 9/3239 |
| 2021/0211299 | A1* | 7/2021 | Hussain | G06F 21/32 |
| 2023/0019652 | A1* | 1/2023 | Lomonaco | H04L 12/1822 |

OTHER PUBLICATIONS

MacMillan, "Rogue, Swindlers and Cheats: The Development of Mistake of Identity in English Contract Law," The Cambridge Law Journal, Nov. 29, 2005, 64(3):711-744 (Abstract Only).

Registeredemail.com [online], "Registered," available on or before Mar. 9, 2021, via Internet Archive: Wayback Machine URL <https://web.archive.org/web/20210309114729/httsps://registeredemail.com/>, retrieved on May 2, 2024, <https://registeredemail.com/>, 14 pages.

Rmail.com [online], "Rmail," available on or before Feb. 12, 2021, via Internet Archive: Wayback Machine URL <https://web.archive.org/web/20210212200902/https://rmail.com/>, retrieved on May 3, 2024, <https://rmail.com/>, 13 pages.

Signal.org [online], "Signal," available on or before Jun. 28, 2021, via Internet Archive: Wayback Machine URL <https://web.archive.org/web/20210628065418/https://signal.org/>, retrieved on May 2, 2024, <https://signal.org/>, 6 pages.

Steller.org [online], "Steller," available on or before Jul. 6, 2021, via Internet Archive: Wayback Machine URL <https://web.archive.org/web/20210706041441/https://stellar.org/>, retrieved on May 2, 2024, <https://stellar.org/>, 13 pages.

* cited by examiner

Fig. 3A

Dear partner:  July 28, 2021

This is a request for digital signatures among participating parties for the agreement on
_____.

The participants are listed below:                                              ⎯ 110
1. Michael Johansson "GD5QWC2E7L7CNZ4LBDF... " ⎯ 115
   - [email]: Delivery Address
   - [email]: Verified by Initiator                                              ⎯ 112
   - Tel: +01 978-739-5587. Verified by Initiator
   - Signer
   - Job Title: _____
2. SignerAlice Cheney "... "
   - [email]: Delivery Address
   - [email]
   - Tel: +01 978-773-6778: Verified by Initiator
   - Signer
   - Job Title: _____
3. Bob Parker "... "                                                            ⎯ 114
   - [email]: Delivery Address                                      (continued)
   - Tel: +01 301-249-0887
   - Viewer
   - Job Title: _____

Fig. 5  Private Contract Negotiation Message

<<Generic Email MIME Headers>>      /530

```
X-AIMail-ContractDescription: 85DE97F9-949C-4F3F-98A9-5958BCE9E2C7;
type=2; flwup=true; cid=EE338D9F-220F-45B8-9463-9BF38FE81ECA;
phase=signing; init=alice.smith@gmail.com
```
Content-Type: multipart/mixed; boundary="61ef9dee_7fdcc233_95b"

--61ef9dee_7fdcc233_95b
Content-Type: multipart/alternative; boundary="61ef9dee_ded7263_95b"    /510

```
--61ef9dee_ded7263_95b
Content-Type: text/plain; charset="utf-8"
Content-Transfer-Encoding: 7bit
Content-Disposition: inline This is a secure Ai-Fi Mail, viewable only through your CounterSeal App.
--61ef9dee_ded7263_95b
Content-Type: text/html; charset="utf-8"
Content-Transfer-Encoding: quoted-printable
Content-Disposition: inline <meta http-equiv=3D"Content-Type" content=3D"text/html; charset=3Dutf-8">Th=
is is a secure Ai-Fi Mail, viewable only through your CounterSeal App.=

--61ef9dee_ded7263_95b--
```

/520

```
--61ef9dee_7fdcc233_95b
Content-Type: application/aifi-contract-encrypted
Content-Transfer-Encoding: base64
Content-Disposition: attachment; filename="ai-mail.msg"

...

--61ef9dee_7fdcc233_95b--
```

Fig. 6 Final Contract Format

<<Generic Email MIME Headers>>

X-AIMail-ContractDescription: 85DE97F9-949C-4F3F-98A9-5958BCE9E2C7;
type=2; flwup=true; cid=EE338D9F-220F-45B8-9463-9BF38FE81ECA;
phase=signed; init=alice.smith@gmail.com
Content-Type: multipart/mixed; boundary="61ef9dee_7fdcc233_95b"    /610

```
--61ef9dee_7fdcc233_95b
Content-Type: application/aifi-contract-encrypted
Content-Transfer-Encoding: base64
Content-Disposition: attachment; filename="ai-mail.msg"

...
```

/612

```
--61ef9dee_7fdcc233_95b
Content-Type: application/aifi-contract-signature
Content-Transfer-Encoding: base64
Content-Disposition: attachment;
 filename="signature-
110a88c26af1df4edb267a6ebfe01ee271805389566369b44b106c0c5d09bdec.sig"

...
```

/614

```
--61ef9dee_7fdcc233_95b
Content-Type: application/aifi-contract-anonymized-auth
Content-Transfer-Encoding: base64
Content-Disposition: attachment;
filename="GD50WC2E7L7CNZ4LBDFPA77BUG2RMF73SRICD7DN4F3KPUWOFEC717YL.bc"

...
```

/616

```
--61ef9dee_7fdcc233_95b
Content-Type: application/aifi-contract-timestamp
Content-Transfer-Encoding: base64
Content-Disposition: attachment;
filename="GD50WC2E7L7CNZ4LBDFPA77BUG2RMF73SRICD7DN4F3KPUWOFEC717YL.ts"

...

--61ef9dee_7fdcc233_95b--
```

Fig. 8 Signature Encoding

```
{
  "signature": "1f0a7fa207dbe980la3220ab8263c30ccdlf...",
  "data": "{ \
    \"mailbox\": \"alice.smith@gmail.com\", \
    \"messageID\": \"DM6PR05MB4555AD80...@DM6PR05MB4555...prod.outlook.com\", \
    \"signDate\": 1628579964029, \
    \"signer\": \"GD50WC2E7L7CNZ4LBDFPA77BUG2RMF73SRIC...OFEC717YL\", \
    \"expirationDate\": 0, \
    \"draw\": \"base64 encoded data\", \
    \"audio\": \"base64 encoded data\", \
    \"video\": \"base64 encoded data\", \
    \"signature\": \"3f201272cedb9b269d6875...\" \
  }"
}
```

SYSTEM AND METHODS FOR INTERACTIVE DOCUMENT SHARING AND AUTHENTICATION WITH PRIVACY GUARANTEE

CROSS-REFERENCE TO RELATED APPLICATIONS

This application claims the benefit under 35 U.S.C. § 119(e) of U.S. Provisional Application Ser. No. 63/265,273, titled "System And Method For Managing End-To-End Electronic Agreement And Signature Process With Privacy Guarantee" and filed Dec. 11, 2021, the entire contents of which are hereby incorporated by reference in their entirety.

BACKGROUND

A document is a paper or set of papers with written or printed information, usually of an official type. When its content is stored in an electronic media, its electronic form can be conveniently transmitted electronically to remote partners through various network means for communicating, sharing, collaboration, contract negotiation and a variety of purposes for conducting business or social functions virtually.

Authentication is the process of determining whether someone or something is, in fact, who or what it says it is. In regards to contracts or other documents, authentication is the prerequisite to sign or to execute the document. A successful authentication process can include providing sufficient evidence for a reasonable audience to conclude that the content presented in a document is what the presenter claims it to be, including minimally the identity of the presenter, its author or authors, and the time of its creation.

An agreement refers to the act of agreeing or of coming to a mutual arrangement accepted by all parties to a transaction. A contract is an agreement to create a legally-enforceable obligation to perform, or refrain from performing, a certain task related to a transaction. In 2000 federal legislation enacted the Electronic Signature in Global and International Commerce Act. The e-signature law made electronic contracts and signatures legally binding in the same way a paper contract is a binding document. Digital signature solutions automate the business processes for bringing about digital transformation; at the same time, users expect business processes to be easy-to-use, to be able to provide flexible accessibility with high security, and to be compatible with all rules and regulations. Digital signature provides security and boosts trust in a business process, thus playing an important role in business transactional processes.

When transmitting a document electronically, the authentication has become a highly vexing issue, especially when it is conducted through emails, instant messengers, text messages or other forms of modern communication. The content of the transmission is usually not encrypted or not encrypted end-to-end, the integrity of the transmitted messages may be compromised en-route, and most troublesome of all, the metadata of the communication is rarely protected with adverse impact on the privacy of the communicating parties.

With the availability of the Internet and increased usage of mobile and Internet-connected devices, there is a rise in the demand for cloud-based security technologies and solutions. Cloud-based e-signature solutions offer benefits such as cost-effectiveness, easy deployment, security, and single management facility across all end-user communication devices. If an e-signature service like DocuSign is adopted, a contract negotiation is no longer as simple as the traditional negotiation process that involves parties with vested interests through many conversations and message exchanges culminating in the final contract signing oftentimes taking place in a face-to-face ceremonial meeting. Prior to the advent of e-signature technology, most of the interactions between participants are direct personal communications without involving any third-party "service providers". In contrast, looming large behind the modern day contracting parties and negotiation activities is the complex all-encompassing e-signature cloud service that can include users interacting with the service in setting up the account, accessing the public websites, subscripting various service options with varying levels of payment choices, selecting storage options for application data and retention scheme, and committing to the delivery network for processing signed contracts. Most troublesome is the indirect identity authentication mechanisms which can be delegated to the service provider. This service-provider-centric approach creates a third-party intrusion into the confidentiality of contract negotiation. For business applications where insider confidentiality is to be protected such as mergers and acquisitions, price biddings, IP transfer, offshore outsourcing and many others, a metadata-preserving document exchange service with authentication enforcement mechanism is sorely missing.

SUMMARY

This specification describes systems, methods, devices, and other techniques for conducting an electronic agreement negotiation process that is "provider-less", and hence "account-less", among the participating members of the negotiation group. Implementations of the subject matter described herein include a computer-implemented method, which offers a private electronic agreement negotiation software client with support for authenticated e-signatures. Participants communicate with each other through application messages issued from this client software on supported devices after authenticating themselves to the client. All negotiation messages are communicated privately and the identities of individual participants are not exposed to any outsiders, including any service providers or platform operators, during the negotiation process.

Specifically, this specification describes systems, methods, devices, and other techniques for a group of clients to engage in a privacy-centric discussion by exchanging private messages pseudonymously and anonymously. In the formal setting where the discussion is to negotiate an agreement or contract and to work toward a formal document agreed upon by all participants, the final concluding document or contract is to explicitly contain the identities of all participants with documentary evidence, including all participants' signature authenticated by a third-party service, to reduce mistaken identity and its adverse effect on contractual validity. Both the content of the final document and the proof of authentication for each participant remain private to the discussion group in encrypted form, decodable by those participants owning the authenticated identities. The final document can be recorded on a trustless blockchain-based repository.

Some implementations of the disclosed subject matter may, in certain instances, achieve one or more advantages. All agreement-related interactions among participants are passed around encrypted from end-to-end, avoiding man-in-the-middle compromises. All relevant metadata are protected securely, made non-traceable and without the risk of leaking out of the exclusive group of participating members. The present technology provides a secure environment such that all non-public information regarding an agreement negotiation can be protected and accessible to insiders of the negotiation. All metadata generated by the agreement negotiation or discussion can't be associated with any PII (Personally Identifiable Information) attributable to any members of the discussion group. This is the Endpoint Privacy Guarantee offered by the method, where the "Endpoint" is the individual software client participating in the agreement process as part of a formally organized interest group.

All agreement negotiation messages are transported end-to-end and encrypted based on the adopted PKC (Public Key Cryptography) with all participants identified individually through their PKC public/private key pairs. Those PKC key pairs, or Identity Keys, are authenticated against specific PII (Personally Identifiable Information) of individual participants' and used to effectuate the e-signatures if the authentication succeeds. The final contract is delivered to all participating parties with each of their signatures, confirmation receipts, non-forgeable proof of identity authentication and record timestamps. The present technology accomplishes this process of agreement/contract negotiation without exposing negotiation contents to any service providers or "go-betweens". Optionally, the negotiation process may be conducted based solely on those Identity Keys without prior association with any PII as an anonymized process to anyone outside of the negotiation group or process.

These and other implementations can optionally include one or more of the following features:

The MRR Service implements a message registration/relay service that verifies and potentially transforms message content based on published rules (e.g. Base64 Encode/Decode, "QR" code conversion, etc.) before relaying the submitted messages. It may also offer message recording, delivery evidencing, timestamping and return receipt services, based on which the methods described herein for conducting an electronic agreement process can then provide authentication, verification, and confirmation of the information contained within the return receipt. This confirmation can take the form of an email confirmation, affidavit testimony from employees of various services familiar with the methods documented herein, live sworn testimony in depositions and in court, and other forms of testimony.

The MRR service is typically public and offers a public list of identities, each of which is protected by one or many PKI key pairs or SSL/TLS certificates. In some scenarios certain discussion/agreement/contract negotiation groups may deploy their own MRR service, the identities of which are known to the private group or groups.

The Blockchain Registry Service supports the Session and Identity Service for mapping between the Identity Keys and their session resources, change monitoring and other record retention and storage services on a public blockchain (such as the Ethereum Network or Stellar Network) as a Smart Contract with offchain resource management.

The MRR Service may be deployed in multiple embodiments, each of which is offered by independent and disinterested third parties based on a set of well-defined and published API or Web API, unaware of the callers under the e-contracting application scenarios. The "service" aspects of the architecture are limited to those "foundational" or "operating" (as in "Operating System") functions that manage publicly shared resources or functions, such as the address registry, verification of account ownership with specific transports or social networks, signer identity construction and authentication, identity theft prevention, location of various resources such as data storage and key spaces, and of course the network transport support. In other words, foundational functions or services are not aware and have no visibility of any application-specific properties of the callers above their functional service layer, particularly those involved in the process of formulating the agreement or conducting the negotiation. All non-foundational application-specific functions are consigned and distributed to the clients, namely the personal applications running on hardware or software platforms owned and managed by individual users or agreement negotiation participants themselves Although the method and process described herein are most relevant to agreement and/or contract negotiation, they are applicable to any applications where a number of participants engage among themselves in many rounds of discussions through exchanges of private messages which produce certain documents along the way that may include long-term backup, recording or archiving. Each archived document is authenticated per the application criteria of the application process where the participants engage in.

In one general aspect, a method is performed by a server. The method includes: receiving, by a client device of a user and from an application server, a software component to install on the client device, the software component enabling the client to communicate with other client devices involved in a document-review event; generating, by the client device, an identity key based on a public/private key pair derived from a Public Key Cryptography (PKC) algorithm, to be associated with the user in the document-review event; defining, by the client device, one or more personally identifiable information (PII) of the user, to be associated with the generated identity key; authenticating, initiated by the client device, one or more defined PII, by communicating with one or more message registration relay services (MRR) to start an authentication challenge/response process, without revealing the public key of the client and any of its defined personal identifiable information; obtaining, by the client device, an authentication receipt from MRR, digitally signed by MRR indicating a successful completion of the authentication challenge process; assigning, by the user to the client device, one or more other participants to be involved in the document-review event based on their public key and one or more of their respective PII, determining, by the client device, a message delivery transport for the document-review event to each of the other participants; and communicating, by the client device and to each corresponding client device of the other participants of the document-review event, the public key, the defined PII associated with the identity key, and the MRR authentication receipts for the client device for each of the PII.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation causes the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes: for each of the one or more other participants: communicating, by the client device and to each corresponding client device of the other participant, one or more document drafts associated with the document-review event with signatures of the user based on the associated identity key, through the determined message delivery transport; collecting, by the client device and from each of the corresponding client devices of the other participant, document drafts associated with the document-review event with the signatures of the other participant involved in the document-review event; and recording, by the client device, the documents and signatures involved in the document-review event indicating completion of the document-review event.

In some implementations, wherein the message delivery transport includes at least one of an email, instant messenger, social media, phone and/or SMS, audio/video conferencing, a social security number, and a residence address.

In some implementations, wherein each of the one or more other participants is authenticated by the client device using the PKC based on the identity key pairs private to the document-review event.

In some implementations, the method includes verifying, by the client device, one or more signatures and/or the MRR authentication receipts of the corresponding client devices of the other participants in the document-review event based on their respective identity keys.

In some implementations, the method includes cording the involved documents and signatures on a blockchain.

In some implementations, wherein the document-review event comprises a contract negotiation.

In one general aspect, a method is performed by a server. The method includes: generating, by a client device of a user, an identity key based on a public/private key pair derived from a Public Key Cryptography (PKC) algorithm, to be associated with the user; selecting, by a client device of a user, an endpoint address of a personally identifiable information (PII), to be associated with the user; based on a determined type of PII of the selected PII endpoint address, generating, by the client device, a request for notarization challenge with parameters comprising the endpoint address for the request, a unique request identification code, the type of the selected PII, the endpoint address of the selected PII, and the encrypted, encoded and signed public key of the user; transmitting, by the client device and to a message registration relay (MRR), the generated request; in response to the selected PII endpoint receiving a notarization challenge from the MRR with the unique request identification code, generating, by the client device, a response to the notarization challenge confirming a receipt of the challenge on the PII endpoint, the original unique request identification code relayed by MRR, and the encoded and signed public key of the user; transmitting, by the client device and to the MRR, the generated challenge response to the received challenge on the PII endpoint; receiving, by the client device and from the MRR, a message indicating the receiving of the challenge response to the notarization challenge and its successful authentication; and recording, by the client device, the MRR receipt message indicating the successful completion of the authentication challenge.

In some implementations, wherein the communication channel between the client device and MRR is authenticated and encrypted.

In some implementations, the method further includes: computing, by the client device using the public key of the MRR, a secret key; encrypting, by the client device using the secret key, the message; and transmitting, by the client device and to the MRR, the encrypted message.

In some implementations, the method further includes: in response to transmitting the encrypted message to the MRR, receiving, by the client device and from the MRR, the message indicating the MRR can generate the secret key based on determining the MRR decrypts the message with a correct private key.

In some implementations, wherein the determined type of the PII comprises at least one of an e-mail address, a social media account, a phone number, a social security number, and a residence address.

The details of one or more embodiments of the subject matter of this specification are set forth in the accompanying drawings and the description below. Other features, aspects, and advantages of the subject matter will become apparent from the description, the drawings, and the claims.

DESCRIPTION OF DRAWINGS

Detailed description of the various embodiments of the technology will be made with reference to the accompanying drawings.

FIG. 3A is the first page of a two-page example which starts off the request to all Contract Participants for their signatures. The first part is the PII Part consisting of all the PII Sections to their respective participants.

FIG. 5 is the Contract Signature Request from Moderator alice.bender@gmail.com to participant bob.smith@outlook.com. The X-AIMail-SKM, X-AIMail-UUID and X-AIMail-ContractDescription are custom X-headers specific to the present technology for facilitating the process of contract related messages. The actual contract is encrypted and appended to the request as an attachment.

FIG. 6 outlines the final contract formatted as a MIME or MIME-like document.

FIG. 8 illustrates, as an example, how the signatures are encoded, including the timestamps, the public key of the signer, the e-signature, and other authentication data, including the audio/video recording of the signer.

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

The subject matter described herein generally concerns the private communication among participants engaging in an agreement negotiation. It relies on the underlying foundational transports implementing asynchronous cryptographic protocols, like the one provided by the popular Signal Protocol (https://signal.org, formerly known as the TextSecure Protocol). It can be used to send end-to-end encrypted messages from one party to another, with a variety of message encodings such as those for voice calls, video calls, and instant messenger conversations as long as the messages are well-formed in distinct chunks or groups. The exemplary Signal protocol was developed by Open Whisper Systems in 2013 and first introduced in the open-source TextSecure app, which later became Signal.

The Signal Protocol is frequently overlaid over other message-based protocols, most notably the IM (Instant Messenger) protocols of various lineages. Recently it has been successfully applied to email protocols such as that in the Ai-Fi SecureMail product offered by Ai-Fi.net, incorporated. As long as the chunk of data can be correctly formulated and passed on from device to device, a message can even be transported manually (such as by copying onto a sheet of paper, to be read by an OCR device or a QR code reader) to effect an intermediate hop of the underlying transport.

The capability of this end-to-end secure message communication further assumes that the endpoints of the adopted transport are assigned with identifiable endpoint addresses (e.g. email addresses, not necessarily public IP addresses of IP protocols). Any communication or messages are included to be securely attributable to an individual's endpoint's identity registered to a Session Service, encrypted end-to-end with perfect forward secrecy and strong security against man-in-the-middle attacks. Other extraneous functions such as those defined by OTR (Off-the-Record messaging) are not assumed in the present technology.

Figure 1:
FIG. 1 is a depiction of a meeting typical in the traditional contract negotiation process prior to the advent of electronic contract negotiation and e-signatures. There is no service provider involved in this traditional setting. The privacy of the contract negotiation is easily obtained by arrangements such as the private meetings depicted or private communication conducted over the phone for example.

The Signal Protocol lends itself naturally to the "chat room" or "team chat" features popular to many instant messenger applications, which can be utilized to emulate the virtual meeting function during contract negotiation as depicted in FIG. 1. Here, an agreement/contract negotiation involves many discussions and meetings among subsets of participating members. It also frequently involves two-party communication, oftentimes asynchronously, for issues without the need to call for the presence of all participants.

In the example embodiment the email is used as the primary asynchronous message transport. This does not preclude the use of other types of transport as an alternative or complementary foundational service for message passing and session management. For instance, the Signal Protocol and its popular application as the basis of an IM is also suitable for being the transport service for agreement negotiation with the IM accounts as the endpoints, which is more suited for situations where end-to-end real-time or synchronous communication sessions are needed. One such situation is when it is useful to conduct an authentication session (mutually verifying the identities of each other) and take advantage of the real-time property of the IM remote conferencing assisted by strong audio and video cues. In other words, this present technology will support multiple parallel transports when situations call for it.

Figure 2A:
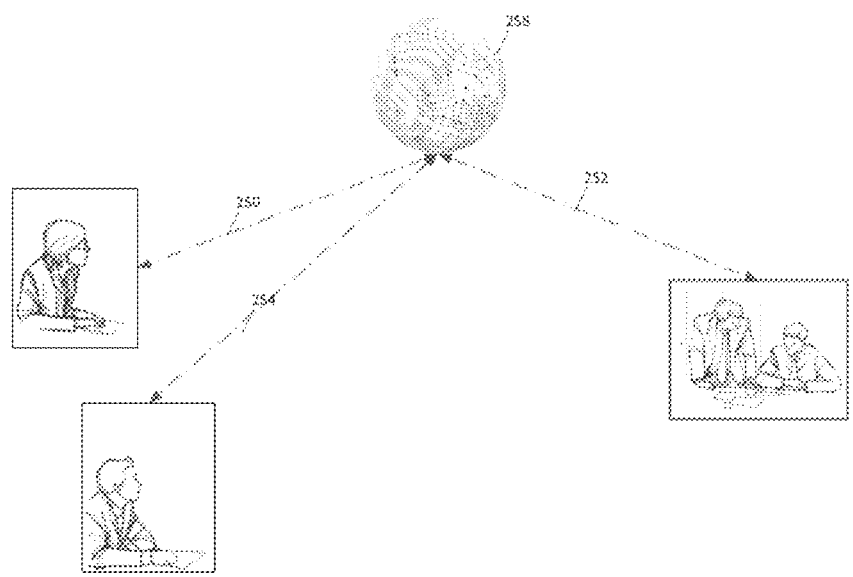
FIG. 2A depicts the same Contract Group described in FIG. 1 conducting a contract negotiation under an e-signature/e-contracting service provider 258, with three Contracting Parties interconnected through communication sessions 250, 252 and 254 and distributed geographically.
Figure 2B:
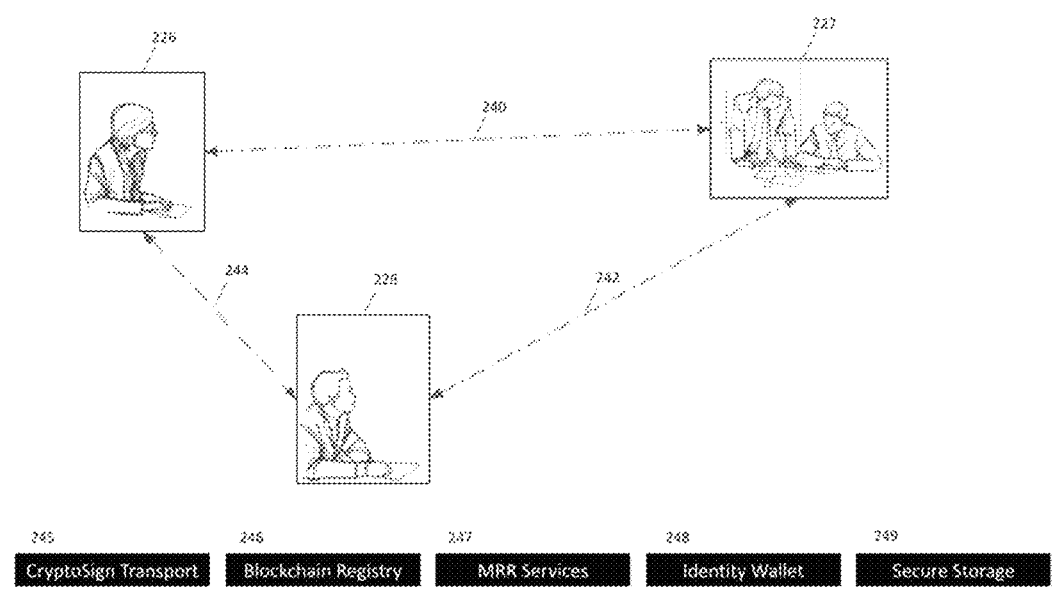
FIG. 2B depicts the same Contract Group as in FIG. 1 and FIG. 2A conducting a contract negotiation through the present technology, an implementation of the present technology. All contracting parties interconnect with each other directly and encrypted end-to-end (240, 242, 244) with all metadata anonymizable through this embodiment. They are free to acquire needed services from any foundational service providers, outlined in 245 through 249, agnostically. Services 245 through 249 are independent and disinterested third parties and unaware of the service requests coming from an e-contracting application.
Figure 2C:
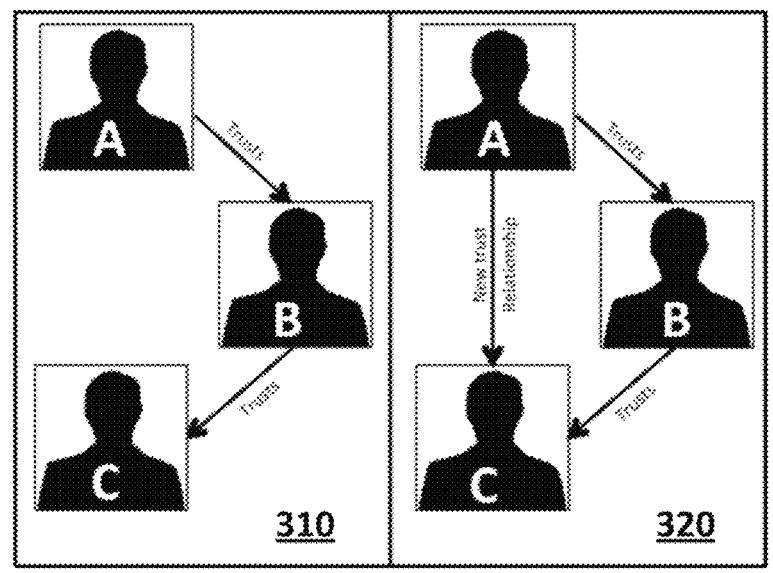
FIG. 2C Depicts the transitive trust path frequently relied upon in traditional contract negotiation settings, under which the trust relationships are established autonomously within a Contract Group.

In those cases where multiple transport endpoints are involved, the PKC Identity Wallet, depicted as 248 in FIG. 2B as one of the foundational services, can provide all the identity key pairs for their respective transports, achieving a unified identity management. In other words, there can be multiple independent transports deployed as part of the current framework supported by the variety of foundational service 245 in FIG. 2B with many identity key pairs attributable to individual participants through their respective Identity Wallets.

Additional parallel transports such as 1M can be activated when real time or synchronous communication is desired such as the case when real time biometric data are being collected. This is the architectural advantage of having individual contracting parties conducting and triggering their own authentication activities per the needs of their applications without the complication of artificially working through a third party service provider.

Before messages can be transported between two parties, a private and secure session can be created between them, mediated by an independent foundational Session Service, relying on the various types of session databases depicted as 246 in FIG. 2B. The Ai-Fi SecureMail is a recent implementation published in 2018 that applies the Signal Protocol to the email systems and incorporates a background Session Service involving a public cryptocurrency blockchain. In some implementations, an embodiment of the primary secure transport component with multiple extensions is to support the additional criteria for contract/agreement negotiation. The most notable extension over and above the foundational transports 245 is the threading of relevant messages recording and supporting a particular agreement negotiation, with message types such as the Signature Request Message issued from within a thread that orchestrates the stringent agreement/contract signing process.

As mentioned, the session service is assisted by a blockchain-based Session Registry (or more accurately, Identity and Session Registry) to turn some transport, e.g., email, protocols into parts of an asynchronous message transport and to support the email addresses as the session endpoints (or delivery addresses/endpoints). It also verifies the ownership of the submitted email address by sending a secret code delivered to the submitted email address before entering the claimed identity into the Registry and provides an index structure that maps the email address to the location where its session data including the key materials are stored. The claimed identity is then tied to the PKC Identity Key (public key part of a key pair owned by the applicant), issued or optionally submitted by the owner, and the verified email address. Given an email address and assisted with its registered session key materials, any other identity or holder of registered Identity key with a registered email address may locate it through the Registry and retrieve all the key materials for constructing an end-to-end encrypted session between them. For example, the email address is the transport endpoint for the current application. The Session Registry needs not be centralized to any monopolized provider. It may be distributed to many different providers and can even be structured as federated identity/session services. In some examples, the Session Registry of the current application provides an immutable log built on a public blockchain for any changes and modifications to the identity and session materials of registered identities, which allows the implementation of the roles of auditors and monitors similar to those implemented by the Certificate Transparency project.

The sessions supported by the present technology are end-to-end, encrypted, anonymizable and immune to man-in-the-middle attacks. This protected and direct communication among contracting participants opens up additional rich and powerful authentication possibilities not usually available to cloud based e-contract services, such as the direct, one-on-one and real time confirmation of identities without intermediaries (through phone calls or video conferences). It also provides anonymized privacy and minimizes the risk of mistakes as to identity if the contracting participants desire an extra level of risk reduction.

In addition to the Session Registry, another enhancement by the present technology designed for the construction of the final contract or maintenance of the contract negotiation lifecycle is the extraction of relevant emails from their storage maintained by the email providers. The email retention function offered by the email providers, albeit reasonably long and reliable, is not directly translatable to what is necessitated by the present technology in retaining the records. The email retention provided by the email service providers is also subject to different rules of access from what is utilized by the current technology. Therefore the storage provided by the email providers is considered temporary and part of the inner working of the message transport by the present technology. Once an email is delivered by the email transport to the current method, its follow-on storage and retention are subject to the specific rules of the current technology. All relevant emails can be first read into a work space by the application client on the running environment before processing. The work space is of limited storage size and can be backed up periodically before it is filled up. The backup schedule can be set as periodical on a fixed time schedule or based on a configurable high-water mark. The materials backed up (all the email, their decryption keys and the final contracts relevant to individual agreement threads) can be saved and used for evidentiary purposes when called for. The legal criteria or company record/contract retention policies determine the process and time scale of the archiving process. Although this record retention period for other types of transports, e.g. IM, this may differ from emails, the basic idea regarding the record storage and retention applies to all the transports which are considered as the foundational service of the current technology.

In the illustrative embodiment the email is adopted as the transport. The Transport Endpoint address is naturally the corresponding email address. Note that this Transport Endpoint address is not necessarily associated with any PII. If the endpoint is acquired from a public email service such as Gmail or Outlook, a brand new "burner" address is very handy in getting an email address without any PII attached. Another convenient scheme is to encode the public key portion of the Identity Key into a displayable "local-part" of the email addr-spec in order to avoid the need to artificially create a burner address. For instance, the last 20 bytes of the public key with 0x appended in front would look something like
0x71C7656EC7ab88b098defB751B7401B5f6d8976F@ai-fi.cc, In the illustrative embodiment the client software maintains the message flow by the following architectural elements:

Contract Group: This comprises all the stakeholders (persons or organizations), their representatives, witnesses, other participants, etc., entering into a contract negotiation process with the aim of reaching consensual agreement among all involved parties on the matter at hand.

Endpoint: The present technology is a system and method for processing message-based communications between a group of computing devices. We denote those virtual points where network messages and connections start and end as Endpoints, which is usually software-based and managed by a specific process or service on the computing device. Depending on the transport adopted in an embodiment, an endpoint may also be represented by a port in the Internet Protocol TCP or UDP, an email address in the email protocol, an IM account ID, or even a Facebook page tied to a Facebook account. The type of Endpoint and its associated process or service define its security and privacy characteristics. The endpoint may not necessarily be virtual. For instance, a residence address or PO Box reachable by USPS mails can also be an endpoint, which is useful for authenticating members of a Contract Group.

Contract Thread: A contract negotiation and many other organized discussions may be characterized as a set of relevant messages exchanged among all the contracting parties, which culminates in the formation of the final agreement or contract. It utilizes the support of some foundational services such as the Ai-Fi SecureMail (if email is selected as the transport), the Message Registration Relay Service (functionally similar to USPS Registered Mail), the open-source blockchain such as Stellar (https://www.stellar.org) that allows attaching data to a cryptocurrency account and many others. As a housekeeping mechanism, all those relevant messages (not necessarily limited to emails) sent or received during the contract negotiation process are collected and logically grouped within the construct of a "thread", much like those email threads typically seen in email services. A contract thread may include those created while interfacing with some of the foundational services, such as the request for registering a message to the Registered Message Service or its return receipts. A frequently utilized service is to provide storage resources for materials created during the negotiation and the hash values for those materials to be referenced by a separate recordkeeping scheme (such as the final contract) as a summary when the originals are considered too voluminous. Each thread is identified by a unique Thread ID for easy identification and grouping, either implicitly or explicitly. A contract group may involve themselves in multiple agreement or contract discussions, each of which is identified as part of a Contract Thread.

Contract Moderator: For administrative purposes, a member of the Contract Group is elected as the Moderator who leads the contract negotiation process for a particular thread and makes sure all procedural steps of the process are observed based on an agreed set of rules. The responsibility of the Contract Moderator involves defining the participants in terms of their PII and Contract Endpoints with the specified authentication criteria, deciding the message delivery transport, collecting and distributing the contract drafts, initiating e-signature process or soliciting e-signatures, and executing or communicating the record retention arrangement for the final contract as agreed. This election of Contract Moderator is purely managerial and therefore sometimes referred to as the Initiator in order to avoid any implication of its special standing. It has no bearing on substantive matters such as contract signing and authentication on Contract Group members. The Moderator doesn't automatically imply his/her role as an offeror or offeree. In some implementations, an embodiment assumes a stable Contract Moderator assignment, which designates the Contract Moderator at the outset who maintains his or her role steadily until the conclusion of the negotiation when the contract is accepted by all participating parties. The designation of the Contract Moderator may change before a successful conclusion of the contract negotiation is reached, in which case a new contract thread may be started with a newly elected Contract Moderator. The previous contract thread may be left inconclusive, pending, restarting as a new thread or discarded.

Contract Endpoints: The Contract Group conducts its contract discussion among participating parties by exchanging messages through those Contract Endpoints associated with participating members. Each endpoint constructed for exchanging messages is also referred to as a Delivery Endpoint indicative of one of its functions. The Contract Endpoints are frequently installed on mobile devices or smartphones for their portability and built-in resistance to software or hardware hackings. In the context of contract negotiation, the present technology frequently equates the members of the Contract Group with the properly authenticated owners of the devices where the Contract Endpoints reside. An Contract Endpoint has the following attributes and associated data:

a. Protected message exchange: Delivery Endpoint is where the contract-related messages are initiated and delivered. Depending on the transport protocol utilized to reach the Endpoint, they could be assigned with some straightforward TCP socket addresses, email addresses, IM (Instant Message) account addresses, etc., as long as the messages can be exchanged in a secured end-to-end manner protected by the PKC (Public Key Cryptography) framework of the method. A member may have access to multiple Contract Endpoints.

b. Endpoint Identity Key: This is the data that is uniquely associated with one or multiple Contract Endpoints. Under the PKC (Public Key Cryptography) framework adopted by the current method, it is the identity key pair associated with the endpoint. The present technology provides an end-to-end private communication between any pair of Contract Endpoints. Due to the number of contracts a particular user of the present technology may participate in, the users can adopt many identity key pairs to manage their identity exposure in various contracting activities.

c. All the identity key pairs are managed through a PKC Wallet, composed of all the key pairs used in the present technology, which can be deterministic or non-deterministic. It can be a self-managed foundational service with or without involving a CA (Certificate Authority). For ease of explanation, the PKC framework adopted in the present technology follows closely that of Bitcoin (for defining identity key materials and account references) and Stellar Network (Ed25519 signature schemes). All the useful key pairs generated by the PKC Wallet are given a specific index number for ease of identification by their respective applications.

d. End-to-end Session Key Material: Pre-keys, etc.

If email protocol is adopted as the transport, each member of the group can build an independent communication session with any other member of the group, although the communication may be conducted as a shared session utilizing "cc" and "bcc", externally similar to a broadcasting protocol, but each channel to a designated recipient is independently authenticated.

Contracting Parties (sometimes shortened as Participants or Parties): A Participant assumes the role of either a Signer, who can sign the final contract, or a Viewer, who may participate in the discussion and is to receive the final contract for viewing purposes without the signing privilege or obligation. Users of this method may utilize this "Viewer" construction to implement the legal role of Witnesses. Similar to the duties of a notary, witnesses are third parties who witness the parties signing the agreement. The difference between the notary and the witness is that the notary has a stamp that is used on the document, formally certifying the signatures. Witnesses, on the other hand, are simply third parties that view or watch the parties sign the agreement. In FIGS. 2B, 226, 227 and 228 are three Contract Parties participating in an agreement/contract negotiation.

Each Participant is reachable through its designated Contract Endpoint, which may have multiple parties associated with it as their gateway for exchanging contract messages.

Contracting Parties are each identifiable through their PII (Private Identifiable Information), a relevant set of which is listed in PII Part of the final Signature Request Message. Each Contracting Party has its own PII Section in the PII Part, such as 112 or 114 in FIG. 3A, in the final contract sent to all the parties by the Moderator in the Signature Request Message. Each subsection comprises multiple PII Entries with details associated with some public identifiers such as the public email addresses, phone numbers, Facebook account IDs, WeChat IDs, Twitter, accounts, etc. They are the basis for meaningful and reliable authentication in terms of their associated public record/persona/membership/account recorded in various public institutions or social groups. Each PII Entry may be independently authenticated to verify its genuine association with the associated Contract Endpoint. Those PII Entries are also described as PII Endpoints if they are also Transport Endpoints.

Authentication of identities: One or multiple Participants are reachable through their designated Contract Endpoints. If the Contract Endpoint is not associated with a recognized PII and/or for any reason, an extra authentication process that formally associates a Participant and some of its PII entries listed in the PII Section of the Contract may be performed as part of the security procedure. A more detailed description of this process will be offered in later sections, which may involve a disinterested impartial third-party (MRR), also a foundational service, to help authenticate the participating parties and collect authentication evidentiary materials. This is over and above the TOFU protocol. Moreover, the Participant may be further authenticated by biometric means.

This method offers a process for negotiating and working towards the final contract authenticated by ascertaining electronic/digital signatures from multiple contracting participants. It involves having the Moderator formally send the contract to all participating parties for signature, collect the returns responding to those signature requests, verify the validity of returned signatures with options to enhance them through audio/video biometrics, timestamp and record the properly signed contract on a permanent registry (as an option), ensure the final contract properly signed by all participants, and allow downloading the signed contract for record retention purposes. The present technology offers a process or method so that all the steps executed as described above are accomplished without relying on any third-party or intermediate service providers.

This method offers the following components for its applications:

Secure end-to-end message exchanges:
a. The method described in this application uses the Ai-Fi SecureMail as an example message transport layer, with the following enhancements:
  i. The Signal Protocol does not guarantee delivery in general, whereas the described method provides extra support to guarantee the delivery of a certain type of message, e.g. the final contract to be signed by all contracting parties, with return receipt.
  ii. The Signal Protocol doesn't support the retention of transmitted messages. Ai-Fi SecureMail doesn't guarantee the retention of emails for any specific amount of time. If an email is deleted from an email service, there would be no proof of notice. Other methods in this application provide tools for retaining e-Contract data.
  iii. The Signal Protocol account authentication doesn't provide privacy, as the service provider can be involved in its operations. It is to protect the account from illegitimate access by users not authorized by the account owner who created the account originally. The Session Registry in the described method may be "privatized" such that Contracting Parties have access to their own private Registry established among members of a Contract Group. This privatized registry further strengthens the privacy of the electronic contracting process.
  iv. A "burner Contract Endpoint", namely a Contract Endpoint that is anonymized such that it is not traceable to the PII of any recognizable participant, may be authenticated by any Contracting Parties to be one of the PII Entries associated with it. A separate Challenge-Response protocol exchange relayed through a traceable third-party intermediate message registration relay (MRR) destined to an anonymized Endpoint (such as an email address, a SMS or MMS receiver on a smartphone, etc.) for identifying the Endpoint internally is available to any participants.
  v. Signal Protocol is widely believed to hold the properties of "Offline Deniability", which is the ability to deny having participated in a particular communication session. This property offers an even stronger anonymization function for enhanced privacy protection. However, it may not weaken the validity of the final signed contract with the appropriate timestamp. The e-signature method incorporated by the method in this application is designed to be self-validating, the authenticity of which is not weakened by any delivery methods. In other words, the transcript of the electronic contract negotiation process recorded by the method may not be sufficient to authenticate the process as the producer of the contract, but the final contract itself signed by all participants satisfies the legal considerations of authenticating or identifying the contract as an item of evidence.
  vi. The "threading" of e-Contract messages in tracking the lifecycle of a particular contract negotiation process is not built into either the Signal protocol software or the Ai-Fi SecureMail. Both lack the upper application layers for monitoring and reporting (dashboard) the lifecycle of a particular contract in terms of the collection of relevant messages. Both deficiencies are remedied by providing an application message threading layer.

Authentication:
a. The first step in establishing an end-to-end encrypted session among all participants using the Signal Protocol is for all participants to generate their respective long-term identity key pairs before interacting with each other (maintained for at least the duration of the contract negotiation). Each Endpoint Identity Key (a key pair) is owned by the participant at the Contract Endpoint and its public key is specified in the entity further detailed in the description of its associated PII Section listed in the final contract as 112 or 114 of FIG. 3A. Although there is no reason to disallow a single Contract Endpoint to be associated with multiple participants, for ease of discussion this embodiment assumes the association is one to one. This inter-party-authentication carried out by all contracting participants are conducted through the following means:
  i. Biometric proof through fingerprints, tamper-resistant voice/audio recordings or facial recognition. This is usually conducted on the Contract Endpoints level with the target of the authentication being the owner of the Endpoint Identity Key (a key pair).
  ii. A participant authenticates another participant's identity by establishing an end-to-end authenticated secure session and verifying the other participant's Endpoint Identity Key.
b. All contracting participants agree not to sign the final contract without satisfying themselves with the success of all inter-party-authentication criteria listed in the contract.
c. Sending messages to or receiving from a Contract Endpoint initially includes utilizing the TOFU (Trust On First Use) procedure to verify the authenticity of the participating parties. Before they exchange messages, the Endpoints can first establish the trust relationship through the TOFU protocol with each other based on their individual digital signature/fingerprint derived from their identity key pairs. The TOFU protocol can be reapplied whenever the established signatures/fingerprints change.

Contract timestamp and validation. There are many sources of timestamps capable of recording to a varying degrees of scale the time of many agreement/contract negotiation or signing activities, examples of which are:
a. TSA (Time Stamp Authority)
b. Blockchain
c. Registered contract messages through MRR The final contract agreed upon and signed by all contracting parties can be exported or printed by users directly for record retention purposes.

Anonymization:
a. If privacy is to be protected, as an option, the Delivery Endpoints may be anonymized to avoid the traceability of all contract negotiation messages and all associated metadata. In other words, the Delivery Endpoints often don't contain any PII (Personally Identifiable Information). The creation and setup of those anonymized endpoints is typically done through a Tor transport, preferable over a clean or Live system, e.g. a TAILS Linux booted from a USB stick with no persistent user storage. It may narrow the selection of message delivery services. For example, applying for a new and anonymized Outlook email address is (currently) much easier than a Google email address. If a smartphone account is used as the Endpoint, a "burner" phone may achieve this need for anonymization. A WeChat account is usually not anonymizable as it enables the applicants to offer acceptable PII. All PII may be revealed inside an encrypted Ai-Fi message destined to an Contract Endpoint if the "outside" Contracting Endpoint is anonymized.

b. An alternative approach to mask a participant's identity is to enlist a proxy and use their endpoint as the representative Contract Endpoint. This effectively avoids the complication of deploying a "burner" endpoint. Note that the real identities of a contracting party can still be explicitly specified in the final agreement/contract to satisfy the authentication criteria or to facilitate its legal enforceability, which are embedded in the content part of the agreement as an encrypted package. Since the authentication for either the proxy or the "burner" case is the same mechanically, we will cover them similarly without making a distinction between them in most cases of present technology.

c. If there is no danger of confusion and privacy is not a concern, a particular Contract Endpoint may be a simple personally identifiable endpoint, which may be identical to one of the PII Entries embedded within its associated PII Section.

We will revisit this subject after the introduction of a few concrete authentication methods.

A contract negotiation process typically involves multiple contracting parties, exchanging messages back and forth any number of times before reaching a conclusion that either results successfully in a final contract or fails to reach an agreement that forces the abort the process without producing a contract. Without loss of generality, the present method presumes that one of the parties is elected to assume the role of the Contract Moderator, who leads and coordinates the contract negotiation process and guarantees the delivery of the final contract to all Contracting Parties in order to facilitate an orderly progression of the process without being given any special rights or privileges. All contract related activities are equally accessible by all parties. Each participant is responsible for their own signature on the final contract and record retention decisions. When some of the Contract Endpoints are anonymized, although the authentication criteria that binds those anonymized Contract Endpoints to their PII Endpoints may be inferred from the successful authentication procedure carried out by the Contract Moderator, this delegation of authentication responsibility can be to the satisfaction of all the Contracting Parties. When in doubt or in need of extra assurance, a Contract Party may conduct their own authentication process without relying on the Moderator. Each participant is entitled to voice their objection or disagreement on any issues involved in the contract negotiation. Each participant may register their veto power by refusing to sign the final contract.

Although an individual Contract Party may launch their own authentication activities or collect specific documents in supporting their special criteria, the Moderator provides useful resources for upholding the integrity of the final contract by supervising the construction of a tree of trust relationships, reviewing and satisfying individual participants' security criteria, publishing evidentiary materials on an immutable blockchain-based ledger and storing the negotiation messages on a permanent basis. Note that the current framework provides multiple schemes for collecting and storing negotiation messages, even while the adopted transports (such as email or IM) may have their own facilities. The custom data maintenance method may rely on their own data backup and storage schemes for record retention for their special needs.

Once a contract is successfully concluded, any changes to the final contract are considered part of a new and different contract negotiation. In some cases, a contract negotiation may fail to reach a conclusion, in which case the contract thread is simply abandoned.

"Electronic signature" means an electronic sound, symbol, or process attached to or logically associated with a record and executed or adopted by a person with the intent to sign the record. The present technology defines the shared process to be explicitly agreed and adopted by all Contract Participants as their demonstrated intent to sign the final version of the contract as witnessed by all the Contract Participants. As part of this explementary process, the final contract bears the digital signatures of all Contract Participants based on their PKC identity key pairs.

Contract negotiation is basically a series of messages sent/received by the Contract Moderator to individual contracting participants and those between individual participants. If successful, a contract negotiation process would conclude with the production of a formal contract bearing the terms, conditions and the signatures of all signers as an integral part of the contract which also records a timestamp to indicate the time of contract formation. Once the Moderator and all participants jointly come to the conclusion that no more issues outstanding and the negotiation has run its course, the Moderator is delegated to make appropriate changes to the contract based on the feedbacks from all participants and produce the final contract afterwards which the Moderator sends out as part of the Signature Request to all participating Signers and Viewers. Both Signers and Viewers can confirm the reception of the Signature Request, with all the Signers' signatures properly collected and verified by all the participants and the Moderator in particular. The Moderator can legally guarantee the delivery of the final contract with all signatures properly appended to all participants.

The final contract is structured in a format similar to MIME (Multipurpose Internet Mail Extensions) format. The MIME standard is specified in a series of requests for comments. The representative ones are RFC 2045, RFC 2046, RFC 2047, RFC 4288, RFC 4289 and RFC 2049. It extends the format of email messages to support text in character sets other than ASCII, as well as attachments of audio, video, images, and application programs.

This MIME-like document is encrypted by a shared key, distributed to each member of the Contract Group, at the end of the negotiation.

Figure 3B:
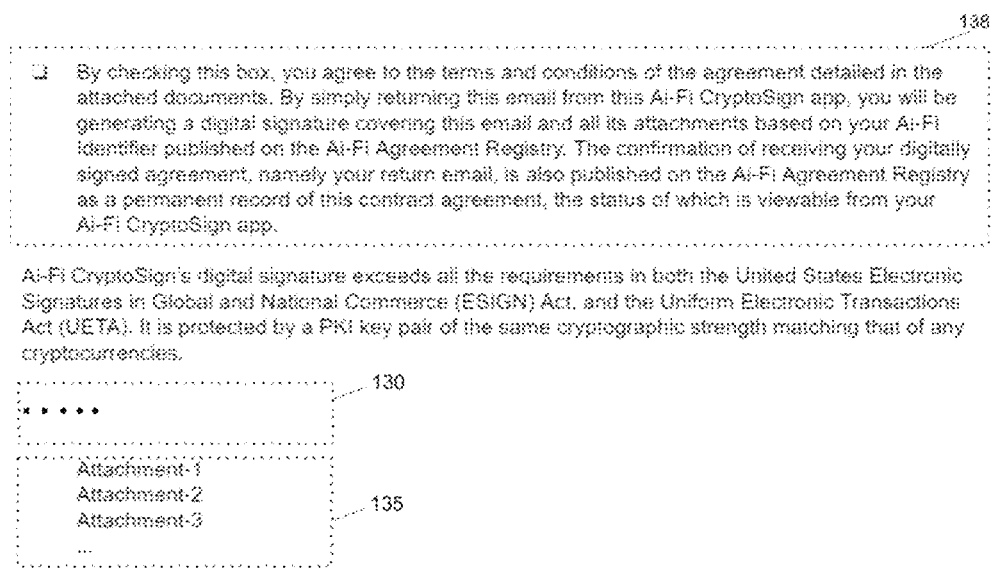
FIG. 3B is the second page of a two-page example following the page described in FIG. 3A. It is to document and confirm the security procedures and the authentication criteria agreed upon by all participants.

Externally, prior to the signing, the request for signature sent by the Moderator and received by each participating party is a secured email depicted in FIG. 3A and FIG. 3B as an example. This request email for signature prefaces with a "cover section" which has a PII part 110 followed by additional parts on the second and following pages depicted by FIG. 3B on the terms and conditions of the contract including the security procedure agreed by all participants. The PII part of the cover section lists the personal identifiable information of all participants, each of which bears the public key of its Identity Key pair (assigned to its Contract Endpoint) as partially indicated as 115 in the drawing. Each participant has their specific section. The PII Section 112 is for a Signer whose signature is requested. Section 114 for a "Viewer", functioning as a witness, an observer, a record keeping personnel, or some other functionary employed for the contract negotiation. Each PII Section comprises a list of PII Entries, which are individually authenticatable identities of the specific Contracting Party the PII Section describes. The Contract Endpoints or Delivery Addresses may be anonymized to suppress metadata during negotiation, in which case there is a need to authenticate the anonymized Contract Endpoint with one or many of its PII Entries. The second page of the example in FIG. 3B comprises a section 138 for the receiver to checkbox and confirm the e-signature process under the current framework, other relevant terms, and additional materials at 130. This cover section depicted in FIG. 3A and FIG. 3B is usually deployed as a template, fully modifiable by the Contract Group per their specific criteria. The actual content of the contract is enclosed in multiple attachments, depending on the nature of the contract and its complexity. Note that this final contract as a part of the request for signature is delivered to all contracting participants through the end-to-end encrypted transport of the present technology.

Figure 4:
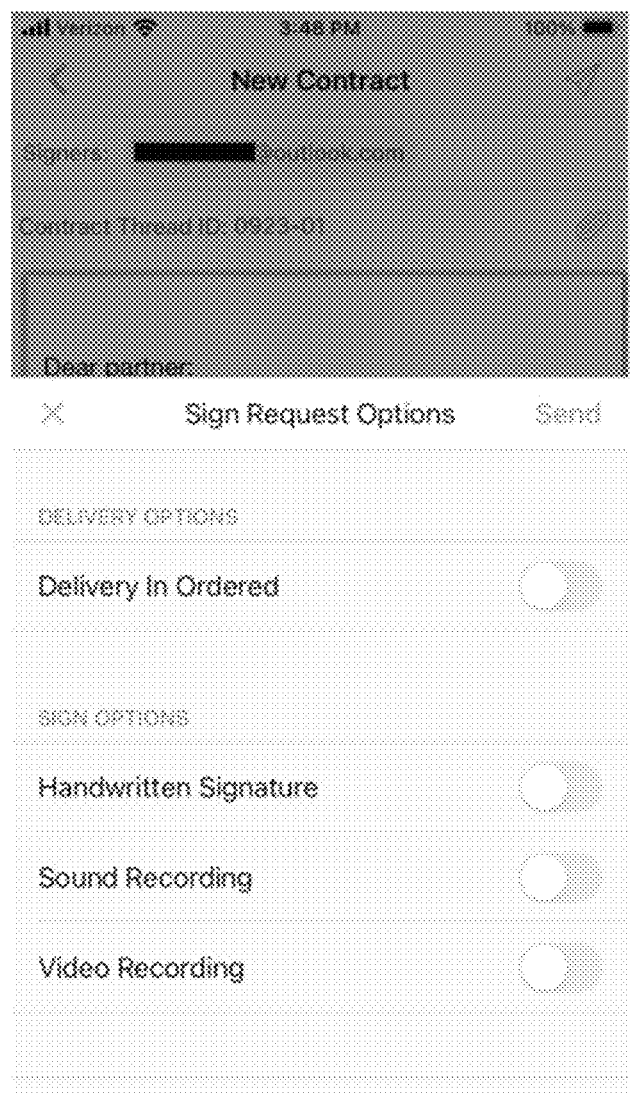
FIG. 4 asks the Moderator who is about to initiate the request for signatures to all participants and to notify the Signers about the status of the contract (by sending them a copy).

The exact process for signing the contract is determined by the criteria laid out by the Moderator when the request for signature is first issued based on terms previously agreed by all participants before reaching the final contract terms. The Moderator formats the final contract and answers the prompt before sending out the request as in FIG. 4. At this prompt, the Moderator indicates if the request is going out in order, as specified in the order of appearances of those PII Sections in FIG. 3A, or in a broadcasting fashion if needing no particular order. The Moderator may also request for the image of a handwritten signature, or request for the biometric proofs of identity through live audio or video recording.

Additionally, since the adopted transport supports end-to-end encrypted real time communication, such as the audio/video session similar to the Signal IM, an authentication session can be created separately between two parties conducting some identity confirmation audio/video conferences, which becomes evidentiary materials for confirming the identity of the parties even when they are anonymized and is also attached to the final contract.

Note that the process of sending out the Signature Request for obtaining all the signatures may fail if any one of the signers fails to accept the offer as is, per the Contract Mirror Image Rule. In that case the current on-going process of signing aborts and typically a new round of negotiation starts again.

FIG. 6 is a fragment of the final contract in MIME format. The present technology incorporates into the final MIME-like document several new Media Type or Content-Type specific to this method. The following is an example list:

aifi-contract-encrypted: This is the main content of the contract, which is the final version of the contract delivered to all parties for signature at the end of the negotiation, typically comprising the following parts:

The contract "cover letter": This defines all participating parties (Signers and Viewers) and the formal terms and conditions based on the relevant rules and regulations such as the ESIGN Act and the Uniform Electronic Transactions Act (UETA) which is to be agreed upon by all participating parties. Each participating party has a list of his/her PII Endpoints to provide details about their identity. This is described in more detail in FIG. 3A and FIG. 3B.

The attachments appearing in the original Signature Request Transaction, which comprises the following:
a. all the contract documents
b. biometric records such as live video or audio recording for authentication if opted
c. records of execution of the authentication protocol specific to this method when the Contract Endpoints are anonymized The "Content-Type: application/aifi-contract-encrypted" at 610 is the section of the main part of the contract as described, with details in the "Content-Disposition: attachment; filename="ai-mail.msg" to indicate the main content.

aifi-contract-signature: This is the collection of digital signatures and authentication information of all contracting parties, one 12 entry per Signer, independently solicited from individual Signers by the Moderator. Under this media type a Contract Endpoint is identified and associated with its PII entries, signature date, hand-written signature image, and the audio/video recording files for rendering biometric PII. The signatures for the final contract as submitted by the individual Signer and for the content of this media type are separately produced to avoid forgery of the body of this entity.

FIG. 8 gives more details for part of the media type aifi-contract-signature in JSON (JavaScript Object Notation) format. It is the signed copy of the "signature" returned by individual contracting parties in response to the Signature Request Message from the Moderator.

The JSON key "signDate" in the aifi-contract-signature is the time recorded by the signing party before sending back their response to the Signature Request Message. The signature by the Contract Moderator is created after the Moderator deems that the final contract and its signatures from all parties have been successfully collected. The value under "signDate" inside the aifi-contract-signature content for the Contract Moderator provides the timestamp for a proof-of-existence for this particular final contract at an instant in time, which ordinarily is later than all other timestamps of non-Moderator parties. A TSA (Time Stamp Authority) may be used if the time of recording the final contract to the blockchain through the Session Registry service is considered insufficient.

Figure 7:
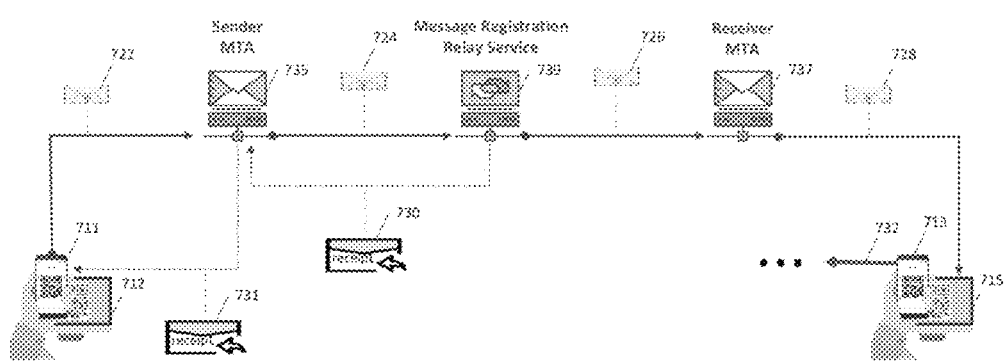
FIG. 7 illustrates the flow of authenticating an anonymized Contract Endpoint which is to be verified to be one of the PII entries. The MRR (Message Registration Relay) service is a functional link in this challenge-response loop.

All "signatures" adopted in various example embodiments of this method are public-key signatures algorithm Ed25519 based on the EdDSA algorithm, operating at around the 128-bit security level. This method can adopt any public-key signature and encryption schemes, to be selected on the basis of efficiency, security level, collision resilience, blockchain compatibility and key sizes.

aifi-contract-anonymized-auth: This is section 614 of FIG. 6 where it records all the information and return receipts from the authentication process involving the MRR service as depicted in FIG. 7 for evidentiary purposes. It also includes all the real-time end-to-end audio/video authentication recordings with timestamp conducted between contracting parties during the negotiation process.

aifi-contract-timestamp: This is the section 616 where the timestamp obtained through a TSA (Time Stamp Authority) at the successful conclusion of the contract negotiation. This particular section may be missing if the Contract Group agrees to submit a proof of the signed contract to the Session Service which writes it to the Session Registry maintained partially on a blockchain (Stellar Network), which also offers an immutable record of time.

These examples of the present method-specific Media Type or Content-Type exemplifies the possible extension to the MIME format in order to conveniently achieve the encoding of the application messages. In some cases, all sections of the custom Media Types are encrypted with keys derived from the Identity Wallet and conforming to the same scheme that the aifi-contract-encrypted part is encrypted in the original Ai-Fi SecureMail product. To further obscure the content contained in various parts of the final MIME format, the MIME itself can be enclosed in an encrypted envelope.

In the electronic agreement/contract negotiation process a collected electronic record or electronic signature is attributable to a person if it was the actual act of the person. It assures that the record or signature is not ascribed to a machine, as opposed to the person operating or programming the machine. This method offers a framework under which many options are provided for ensuring the signatures on the final contract attributable to those formally and explicitly defined in the contract. As an architectural framework, this method offers a toolset for Contract Participants to choose from for implementing their own security procedure for this guarantee of personal attribution over and above those built into various foundational services. It takes advantage of the end-to-end secure/private connectivity among Contract Participants to recover the rich power of personal interactions readily available in traditional face-to-face meetings or direct personal interactions but often lost in the contract negotiation that is mediated by a service provider like DocuSign.

Based on the risk assessments and security criteria collected from all participating parties and the agreed-upon security procedure accepted by all participants, the final contract should list all the successfully completed authentication methods adopted for attributing individual signatures on the final contract to their respective participating parties. This is commonly done to overcome possible claims that a hacker intervened, uncovered forgery, counterfeiting, etc., and to enhance the weight to be accorded the evidence of the security procedure as tending to establish attribution.

The authentication or attribution process is built up as follows:

a. As previously described, each Contract Participant is equipped with a PKC wallet containing many attributable PKC public and private key pairs. Any key pair can be registered with the Ai-Fi foundational Session Registry service and bound with multiple transport endpoints, PII identities and a variety of identity data. This registration with the Session Registry is conducted with due effort to make sure the registration process is performed by a person and not a machine, backed by a frequently seen "I am not a robot" test that is difficult for a machine to pass such as those CAPTCHA (Completely Automated Public Turing test to tell Computers and Humans Apart) tests. To qualify as an accepted registration, the transport endpoints and the submitted identity information are validated by the Session Registry service for the claimed ownership of the applicant. Once this "binding" is successfully passed, those registered entries (endpoint, PII entries, personal data, etc.) in the Registry are immutably recorded and made publicly accessible. The primary function of the registry is to allow easy access in a trustless architectural environment after initial validation. They may also be monitored for intended or unintended changes as a basis for uncovering data breaches and enforcing the security procedures within a defined timeframe. Under the current framework, the various types of PKC key pairs become the electronic identities of the Contract Participant. The authentication or attribution of actions taken by the human and/or electronic agent of a Contract Participant is primarily embodied in the process of evidencing the tie-in of the human agents with their registered identities.

b. A Contract Endpoint is attributable to its Identity Key (the PKC key pair) with the help of the foundational service through the binding process enforced at the signing up with Session Registry as described above. Before any two participants may communicate to each other, their respective Contract Endpoints can be first accepted by the other communicating party by completing the TOFU protocol, allowing the participants to apply additional private security checks through certain "out of band" channels of choice (e.g. phone or other social media not part of the transport where the contract thread is based on). A thoroughly and rigorously conducted TOFU process can be relied upon by the conducting party as the basis for vouching for the authenticity of the other party being verified. Note that the information collected by the Session Registry about a registered identity oftentimes is static and not guaranteed to be kept up to date, especially the "revocation" aspect of the registered records. The TOFU protocol is an effective approach of verification based on live interactions and taking advantage of additional authentication "factors" (namely multi-factor verification) in real time.

c. The issue of identity attribution is more involved when anonymized or proxied contract endpoints are involved. Without any PII to work from, the Participants can rely on the TOFU process for authenticating the other parties in a personally conducted verification process. Although a successful TOFU process may be the basis for the conducting party to confidentially vouch for the other party, it complicates the acquisition of or potentially lacks sufficient evidentiary strength without involving a third party. To mend this lack of tangible or objective corroboration, the present framework includes the tools for collecting audio/video biometric data, such as the voice recording of prescribed speech, the video recording of the subject holding a physical driver license, today's newspaper, credit card or passport, etc., as part of the security procedure during the signing of a contract.

d. Another foundational service MRR supported by a disinterested and impartial third-party is offered to formally attribute a participant to their defined identities detailed in their PII section. When utilized at the point of agreement signing or designed to become part of a signature, the real time nature of the MRR service accompanied with an official MRR-sanctioned timestamp remediates the lack of timeliness of the identity guarantee by the Session Registry. Its impartiality is further strengthened by the applicants' masking off their real identity while requesting for MRR services. The exact process on this and the generation of supporting evidence will be detailed later.

e. The Moderator can accept the authenticity of a particular Contracting Party if a certain accepted participant vouches for the new member. We have listed two scenarios where a participant may develop their confidence in the veracity of another participant, namely the reinforced TOFU process and the authentication challenge loop involving MRR. The Moderator can optionally construct a tree of attribution or authentication where all participants appear at least once on the tree. A participant may be entered into the tree as a descendant by finding (and communicating to the Moderator) some other member already on the tree who can vouch for them. In an exemplary embodiment, initially the Moderator creates the tree by conducting a mutual authentication process with at least one other participant and becoming the root.

The present framework offers many mechanisms as outlined above for Contract Participants to select from and tailor their own security policies per the criteria of their special agreement/contract needs. Architecturally, identity key registration is resistant to "split-world" attack for an anonymized protocol endpoint through Tor as the Session Registry has no way of knowing the PII of the requesting party, which is utilized to prepare a custom view for a specific set of victims. However, once the protocol endpoint is identifiable as a PII, it loses this protection. Since the registry is implemented as a key value store for all email accounts registered to the Session Registry and recorded as an immutable log on a cryptocurrency blockchain (Stellar Network), this registry is public and accessible by all users. The Session Registry as a key value store can be reconstructed by going through the public blockchain by any monitoring agent or program. This practically eliminates the possibility of creating a "split-world" by the Session Registry server as a third-party foundational service. However, the binding of a transport endpoint to a Identity Key is delegated to the service provider of the Session Registry, this prerogative is still subject to abuse which may not be ruled out. The TOFU protocol is effective in countering this risk. The multi-factor authentication through MRR is another mechanism to fight against this possible abuse by the service provider of the Session Registry. A misbehaving MRR can launch a denial of service attack against a particular requesting party or a targeted receiver by indicating in the return receipt a fake delivery or failure of delivery notice. An effective protection against this type of attack is to have the sender send an un-registered email in parallel with the request to MRR for a registered email. If the deliverability of those two separate emails differs, an alarm is triggered. Another effective means to monitor if MRR is behaving in a consistent and correct manner is to submit the request anonymously, namely making the request through an anonymous endpoint via the Tor network so that the requester can not be targeted. There are many efficient Gossip Protocols for verifying the consistency of certificate or identity logs, including the Session Registry employed in the present technology.

Up to this point we have not looked at the challenge and impact of anonymization or identity proxying in terms of how it would affect the final contract structure. It is an issue when some of the Contract Endpoints are anonymized or proxied to a third party. Specifically, an anonymized Contract Endpoint does not reveal any PII by itself as the name suggests and a proxied endpoint is not directly related to the PII of the real contract participant. The mapping of the anonymized Contract Endpoint to any of the entries in its specific PII Section in the final contract can be explicitly established, or it becomes susceptible to "the mistake as to identity", a highly vexed areas of contract law (The Cambridge Law Journal, Volume 64, Issue 3, November 2005, pp. 711-744). This method provides support for proving the identity of a contracting party to some PII Entries in its specific PII Section in the final contract, or in the proxying situation demonstrating the Contract Endpoint is allowed access to any corresponding PII entries specified in the final contract.

In the following discussion, the term "MRR" will refer in general terms to a disinterested independent third-party entity which creates and/or operates network functions implementing a message registration and relay mechanism as a foundational service supporting other components of the present technology, depicted as 247 in FIG. 2B. It also acts as an independent and disinterested third-party message verifier, and/or assists in transforming messages into different standardized formats before relaying them. The term is used for convenience of exemplary discussion only, and is not to be understood as limiting the technology.

The present method assumes a shared public service, dubbed as the MRR (Message Registration Relay), for assuring the delivery of messages with authenticated receipts. As the described method carries out all contract negotiations in end-to-end encrypted messages, all contract related messages and contents are opaque to all third parties not directly involved in the negotiation. This characteristic of the method makes the MRR a straightforward implementation which incurs low risk usually suffered by third-party "services" as documented previously. The server itself is identified by an identity key pair, the public keys of which are published and known to all users while the private key is hidden and securely protected by the service.

The function of MRR is to provide an independent message delivery service foundational to the implementation of the present technology. It provides similar function as the USPS Registered/certified Mail to traditional post mail with return receipts and may operate outside of the normal email delivery channel.

In theory, the MRR (Message Registration Relay) server functioning as a message forwarding agent may falsify any message and/or deliver it to any unintended party. This risk is carefully avoided through the authentication scheme defined in this method by encrypting and/or signing the message that is decryptable by the intended receiver. For instance, the signature produced by the "sender-sign( )" function, as its name indicates, used later in the challenge-response process will be detected as falsified immediately since the falsifier has no access to the private key of the sender. The functional aspect of MRR is to register the message forwarding request before sending it to a specified PII Endpoint without involving the sender.

A Contracting Endpoint can be authenticated to avoid the mistake as to identity, that occurs when one party—usually deceived by a "rogue"—mistakenly believes to be bargaining with another, uninvolved, third party.

It is assumed that an end-to-end session has been set up between the Contract Moderator and each of the participating Contracting Parties, confirmed through TOFU, and each such session is protected based on an agreed process of various employed protocols. The protection is defined as the measures taken to deny unauthorized persons information derived from communications of the present technology (encryption), and to ensure the authenticity of such communications (identity authentication and MAC, or Message Authentication Code or message signature). Under the scenarios where the Contracting Parties are anonymized, such as in the cases when the Contract Endpoints are purposely set up without tying to any PII publicly, those private pairwise trust relationships established through TOFU may be further strengthened by a process that cryptographically confirms the association between individual Contract Endpoints with their selected identities defined in their associated PII Entries. This cryptographical confirmation may be incorporated into the final contract as the supporting evidence for authenticating individual Contracting Parties.

The following authentication process is designed to identify or authenticate an anonymized Contract Endpoint with its PII Entry, assuming that the Contract Endpoint is owned or at least accessible by the owners of all its related PII Entries. In other words, the message destined to the specified PII Endpoint could be read and decoded by the owner of the Contract Endpoint that the PII Endpoint falls under in the Signature Request Message which contains the final contract. This authentication system provides evidence, which may be attested to by a Contracting Party, that a privileged operator of the system or device where a Contract Endpoint runs on also has read access to the system or device where a specific PII Endpoint is tied to. This evidence is partially supported by MRR's providing proof of message delivery as part of a particular challenge-response protocol involving multiple electronic messages and by documents which were delivered to recipients with certain protocol-conforming content and representing themselves as having come from certain senders.

Without loss of generality, the following description of this authentication process assumes that there is a single PII Section associated with the specified Contract Endpoint to be authenticated.

The following is the process of authenticating a Contract Endpoint to a specific selected PII Entry. The notation foo(params) indicates a function denoted by "foo" and foo-sign[params] a function that returns a signed data. Note that the logic of foo-sign[params] includes the creation of a MAC for the entity specified through parameters "params" and attaches the signature to the params. The data params are recoverable by striping off the signature or MAC part of the signed data. The Endpoint is reachable through its Endpoint address (through adopted transports such as email, Signal Messenger, WeChat messenger, etc.)

Since the general case involves multiple Contracting Parties, this authentication scheme involves multiple rounds of pairwise authentication process, typically coordinated by the Contract Moderator, such that all parties are individually authenticated by answering the "challenge-response" protocol initiated by the Contract Moderator.

The following authentication method involves a pair of endpoints and allows the first Contract Endpoint (sender) to lead the effort of authenticating the second Contract Endpoint (recipient). This process is illustrated in FIG. 7 for the example case when the message transport is based on the email protocol. It is basically a challenge-response protocol with the sender sending the challenge, which is answerable (basically echoed back) by the recipient at the second receiving Contract Endpoint. However, the challenge is not sent directly to the recipient but to the PII Endpoint associated with a PII entry of the second Contract Endpoint. In order for the second Contract Endpoint to answer the challenge, it can be able to read the challenge indirectly off the second PII Endpoint. This reception of the challenge message indirectly from the PII Endpoint by the receiving Contract Endpoint proves that the receiving PII Endpoint and its associated Contract Endpoint are owned and/or maintained by the same Contracting Party. After the challenge is successfully answered, the correctly formulated response will be sent back to the PII Endpoint of the sender, which is readable by the Contract Endpoint at the sender. The reception of the response can also be conducted in an indirect manner by sending it to one of the PII entries of the first Contract Endpoint. In other words, this two-party challenge-response protocol can be made symmetric. The successful conclusion of the protocol authenticates both parties involving their respective specified PII Endpoint.

For an anonymized Contract Endpoint, its identity needs to be verified and confirmed to be one of the specified PII entries defined in the final contract. FIG. 7 describes how this authentication process is conducted for the case when both endpoints are email endpoints implemented in the fat clients of the present method running on smart phones in the following illustration. In FIG. 7, the Contract Endpoint at device 713 is to be verified as being the owner also of the PII Endpoint at 715. The Contract Endpoint running on device 711 is the sender or verifier, who delivers a challenge to a PII endpoint 715 (or a PII entry in the PII Section of 713 in the contract) and not directly to 713. The real target endpoint at 713 can first read the challenge from 715 before being able to answer the challenge.

In a multiparty negotiation involving more than two participants, some participant may produce a non-existent or artificially created participant to play some critical role in order to gain unfair advantages (e.g. a partial bidder in an auction situation). In that case the endpoint 711 may deliver the challenge directly to 713 to falsify the response which allows 713 to be identified as holding the endpoint 715 as a fake PII entry. To avoid this attack, a disinterested independent third-party Message Registration Relay (MRR) service 739 is introduced to make sure the challenge is delivered to device 715 without interference and the recipient can prove the reception of that message in their response to the challenge which bears the signature of the MRR. The user at client device running at 713 holds the Identity Key of the intended Contract Endpoint, who can have access right for 715 in order to receive the challenge indirectly from 715 in order to answer the challenge.

The challenge is packaged as an email 722, destined to 715, but first delivered to 739 via a few MTA hops. The final delivery to 739 is 724, which doesn't vary much from the initial 722. There are a variety of techniques to make sure the challenge travels to endpoint 715 by passing through MRR at 739. For instance, the challenge may be packaged as an attachment before sending to 739 based on some protocol between 711 and 739 so that 739 knows how to retrieve the challenge before relaying it to 715. After 739 unpacks and recovers the original challenge, it reformats it as a simple email 726 destined to 715, relying on possibly additional MTA hops for delivery as email 728. The MRR also behaves as an email registration service and delivers a return receipt 730 in response to receiving 724, which becomes 731 after passing through a few MTA's. This challenge-response protocol may be made two ways by returning the response to the challenge contained in email 722 back to endpoint 711 via 712. This second half of the two-way challenge-response, starting at 732, is symmetric to the forwarding path and not spelled out herein.

The challenge-response protocol for authenticating an entity by the verifier is quite commonplace. It is frequently conducted by popular service providers in ascertaining the identity of their users when a second factor or multiple factors are to be verified in the authentication process. The present technology is designed to provide anonymity for the participating parties, hence the indirect passing of the challenge via the PII Endpoint before reaching the final anonymized Contract Endpoint which reveals no PII. The MRR is involved so that the parties conducting the challenge-response protocol are not able to collude to falsify the outcome of the authentication. The delivery receipt issued by the MRR service and the records of the successful answer to the challenge by the receiving party are all collected and delivered to the Moderator as evidentiary materials which may be optionally attached to the final contract. This process is further detailed below:

auth-msg=auth-Contract-Endpoint-encrypted(AUTH (verification-code, sending-PII-Entry-descriptor, sending-Contract-Endpoint-ID, nonce)) sender-to-PII=sender-sign [auth-msg, encode-mapping, sender-alias]

The first Contract Endpoint or sender requests the MRR server to deliver the above signed sender-to-PII message to a specified PII Endpoint 715. The destination address for 715 is specified in the request message from 711 to MRR 739. This is the authentication message to be relayed by the MRR to the PII Endpoint 715, which is intended to be disclosed to the Contract Endpoint 713, the target of the authentication process, usually by manually reading it from the PII Endpoint 715 in a local LAN by the receiver with a person involved. The destined Contract Endpoint 713 reads the challenge and echoes it back to the originating endpoint to complete the loop. The MRR is instructed to deliver this encrypted string to the specified PII Endpoint 715 without necessarily knowing the sending Contract Endpoint, as the sender may anonymize the sending Contract Endpoint ID. The sending-Contract-Endpoint-ID is hidden in the encrypted auth-msg that may be decrypted by the intended second Contract Endpoint 713. The device type of the PII Endpoint 715 determines the encode-mapping so that it can be displayed appropriately on the PII Endpoint for the intended second Contract Endpoint. The nonce is to counter replay attacks. The verification-code, readable by the intended Contract Endpoint, may be a simple random character string of sufficient length (to defeat replay, brute-force guessing attacks and other attacks) which needs to be echoed back by the second Contract Endpoint to the sender within a predictable period of time allowing a limited number of retries. There may be additional data to be returned as part of the protocol. The sending-PII-Entry-descriptor is useful when a two-way authentication is being conducted.

A possible "phishing" attack may be launched by someone colluding with MRR (or a compromised MRR) attempting to bypass the PII Endpoint in this authentication message loop by delivering a falsely manufactured auth-msg to the second Contract Endpoint directly (claiming the identify of a PII Endpoint without legitimate access to it). This is possible if the attacker managed to a. defeat the TOFU verification by all participants so that the second Contract Endpoint was accepted by the first as having the identity as defined in the PII Section in the contract, and b. collude with or compromise the MRR so that the auth-msg was delivered to the second Contract Endpoint directly without enabling it to access or read from the PII Endpoint 715 indirectly. Note that without defeating TOFU in attack 1 above the attacker and MRR would not know how to discover the Contract Endpoint.

With the email as the transport in this embodiment, the PII Endpoint 715 is exposed to MRR 739. 711 may adopt an email alias, an burner email address or an email forwarding service to hide its Contract Endpoint. The sender-alias is known to members of the Contract Group, to be directly mapped into the Contract Endpoint 711.

Although there are many known third-party certified/registered email delivery services (e.g. https://registeredemail.com; https://rmail.com), including the one supplied by the present framework, compromising those services is not an easy task. With the present technology, the auth-msg doesn't even need to be delivered electronically. The encoded version of the auth-msg (e.g. in Base64 format or QR code) can be delivered through the USPS registered mail or certified mail to the specified address in the PII Section of the contract for a specific Contract Endpoint, in which case the second Contract Endpoint can easily decode it. In other words, the risk of this phishing attack is minimal.

auth-msg is destined to the recipient owning the PII at 715, signed by the sender in the function sender-sign( ) and delivered to the MRR as a packaged sender-to-PII. It is to be signed again by MRR before relaying it to the PII Endpoint. The encode-mapping describes how the auth-msg ought to be encoded before delivering to the PII Endpoint. It is to facilitate the transmission between the PII Endpoint 715 and the receiving Contract Endpoint 713, depending on the device characteristics of those two different types of endpoints. For example, assuming the Contract Endpoint 713 is embodied in a mobile app running on a smartphone and the PII Endpoint 715 is also an email account and the sender-to-PII is encoded in QR code, as illustrated in FIG. 7, after Contract Endpoint's reading in the QR code it can easily recover the initial auth-msg. The original requestor to MRR may attach additional information or text for MRR to send to the destination to clarify the context or purpose of the MRR message.

delivered-to-PII-msg=MRR-sign-and-register-with-receipt(sender-to-PII,MRR-nonce). MRR-sign-and-register-with-receipt is executed by the MRR, which signs the sender-to-PII before sending out 726 and registers the request in its request log together with a return receipt 730 to be delivered to the request sender 711. The receipt contains all the data submitted with the request including the sender-to-PII. If the PII Endpoint 715 and the destination Contract Endpoint 713 share the same identity, the Contract Endpoint 713 is capable of reading in the delivered-to-PII-msg from the PII Entry 715. Note the receipt 730 is destined to the sender 711 through the email transport, it may not trace in reverse the original delivery path passing MTA 735 literally. The 730 and 731 are to illustrate the fact that the return receipt may take multiple MTA hops before reaching the original sender 711.

The sender-to-PII message is signed by MRR and designed to not affect the displayability on 715 as it may alter the message. The signing provides extra assurance that this challenge-response protocol is strictly followed and the MRR is provably involved.

The destination or second Contract Endpoint 713 reads in the delivered-to-PII-msg from the PII Endpoint 715, decodes the encoded message, verifies the MRR signature if any and then opens the sender-to-PII. The AUTH(verification-code, sending-PII-Entry-descriptor, sending-Contract-Endpoint-ID, nonce) can be decrypted by the intended Contract Endpoint 713. After reading the decrypted AUTH message, it discovers the sender identity through sender-alias and verifies its signature. (In the following, this long AUTH string will be represented simply as AUTH( . . . ) to avoid mistype.)

The MRR-nonce may be further extended to include additional information to facilitate the matching of receipt data to 711 with the echoed data from 713.

authentication-challenge-echo=receiver-sign[receiver-echo(delivered-to-PII-msg, MRR-signature,MRR-nonce)]

receiver-sign will be carried out by the key pair corresponding to the intended target Contract Endpoint 713 before it verifies the signature of the MRR (relay) and the originating sender. If satisfactorily verified, it decrypts the auth-msg and derives the AUTH( . . . ) from delivered-to- PII-msg. If all verifications are successful and the receiving Contract Endpoint decides to accept the authentication challenge, it echoes the message according to the authentication challenge-response protocol. The final signed message of receiver-echo(delivered-to-PII-msg, MRR-signature, MRR-nonce) by the destination Contract Endpoint will be returned to the originating Contract Endpoint 713 through the process starting at 732. Note that the MRR-signature created on the forward path is the dynamic signature created by the MRR, which also appears in the return receipt sent to the sender by MRR. They can match in order to verify that the AUTH( . . . ), as part of the echoed delivered-to-PII-msg, has indeed traveled through the PII Endpoint 715 delivered by the MRR as requested by the originating endpoint. This is to avoid the originating endpoint 711 colluding with the destined endpoint 713 directly, in which case the return receipt and the echo would not match or miss MRR signature.

The originating Contract Endpoint 711 verifies the return message echoed back from the receiving party to its satisfaction and publish the following data and/or include them into the final contract as proof of the successful authentication request/echo challenge when the following two data are consistent with each other:
 a. the original receipt from the MRR's execution of the original relay request from the sender MRR-sign-and-register-with-receipt[ . . . ]
 b. authentication-challenge-echo returned by the destination Contract Endpoint.

The authentication-challenge-echo msg can be delivered through MRR server in its return path at 732 to a PII Endpoint 712 of the originating sender of this authentication challenge (on the reverse path) in a similar fashion as the delivery of delivered-to-PII-msg on its original forwarding path. This can make the challenge-response protocol both ways for mutual authentication.

For parties involved in a contract negotiation, this published authentication record is designed to rule out possible mistakes or misrepresentation as to identities of all participants before allowing them to perform their designated roles in the agreement process. The records of receiving the auth-msg from 711 by MRR 739, the registered delivery record to the PII endpoint 715 by MRR 739, the final echo received by 711 from 713, along with all the message signatures created by all the protocol-enabled entities along the path to the receiving Contract Endpoint 713, which is returned to 711 to complete the loop, are all collected, verified and packaged by 711 as a MRR-registered authentication verification record. This MRR-registered authentication verification record is presented in a human readable format (e.g. PDF) in preparation for being part of the evidentiary materials packaged into the final contract. If any initiated authentication message loops failed without receiving the final confirmation or the authentication challenge echo record turned out to be the result of deliberate falsification and was detected by some contracting parties, the proposed contract would be vitiated and aborted.

The authentication loop described in the previous section assumes that the message loop is initiated by a Contract Endpoint different from the target Endpoint to be authenticated. That authentication loop protocol primarily benefits the initiator of the authentication loop. If it is adopted as the basis of a general authentication scheme for a contract, it would incur a cost proportional to the complexity of O(n-square) where n is the number of Contracting Parties for collecting all the MRR receipts and receiver echoes.

Alternatively, the authentication loop for authenticating all the participants in a contract/agreement negotiation may be simplified by having individual participants initiate their own authentication loop, which can't be falsified due to the involvement of the MRR. Following the same steps as the end-to-end authentication loop defined previously, the sending-PII-Entry-descriptor and sending-Contract-Endpoint-ID need not be specified. The receipt returned by MRR and the delivered-to-PII-msg need not be echoed. Instead, the data previously defined in the authentication-challenge-echo along with the MRR signature (previously in the receipt) are written into the contract by the same entity conducting the authentication loop representing the Contract Endpoint as the proof of a successful self-conducted authentication loop with evidence backed and contractually recorded by the MRR per the users' request and terms of service. This effectively reduces the complexity to O(n) by taking advantage of MRR's involvement and the final contract as a shared record based on authentication and signature materials received from all participants.

Specifically, using the same notation as before, with the 713 initiating a self-conducted authentication loop, the logic below is to prove that he owns 715 as described by a specific PII Entry:
 a. auth-msg=auth-Contract-Endpoint-encrypted(AUTH (verification-code, sending-PII-Entry-descriptor, null, nonce)): This needs not to include the reference to sending-Contract-Endpoint-ID, which is implied by the sending Contract Endpoint (self) and therefore nulled.
 b. sender-to-PII=sender-sign[auth-msg, encode-mapping, sender-alias]: This stays the same.

delivered-to-PII-msg=MRR-sign-and-register-with-receipt(sender-to-PII,MRR-nonce): This function is much simplified without the logic of sending the receipt. The original verification-code can be structured to include the context of this authentication request by the initiating Contract Endpoint such that the delivered-to-PII-msg may be precisely matched to the original request to MRR. Since the request is issued by the original sending Contract Endpoint 713, the owner would be waiting at 715 for the MRR message. Once the MRR-signed message arrives, the 713 reads it in, decrypts it, and writes the original AUTH( . . . ) content and the MRR signature into the contract without the need to issue echo 732 to MRR (who can insert it into its service log per the service requestor) and any other parties. This is conducted per the agreed security procedure in order to satisfy the conditions for acquiring all the contract signatures and to obtain the final contract.

Figure 9:
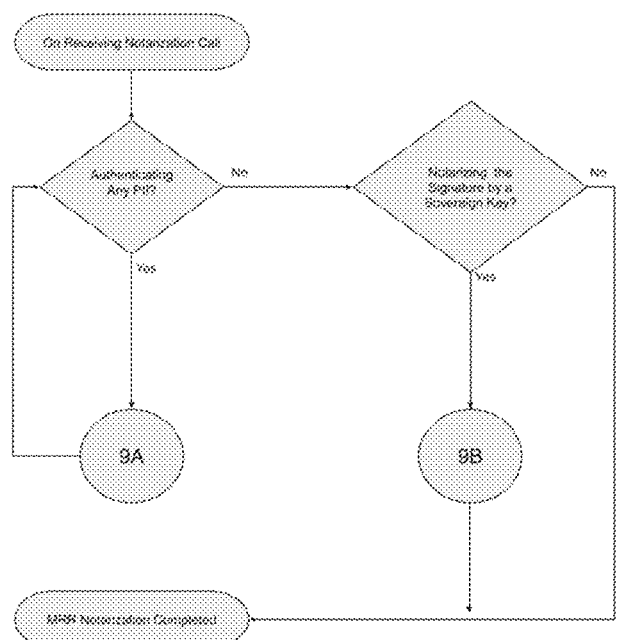
FIGS. 9, 9A, and 9B illustrate a flow chart for an example MRR request handling in answering an authentication request supporting a contract negotiation through the present technology.
Figure 9A:
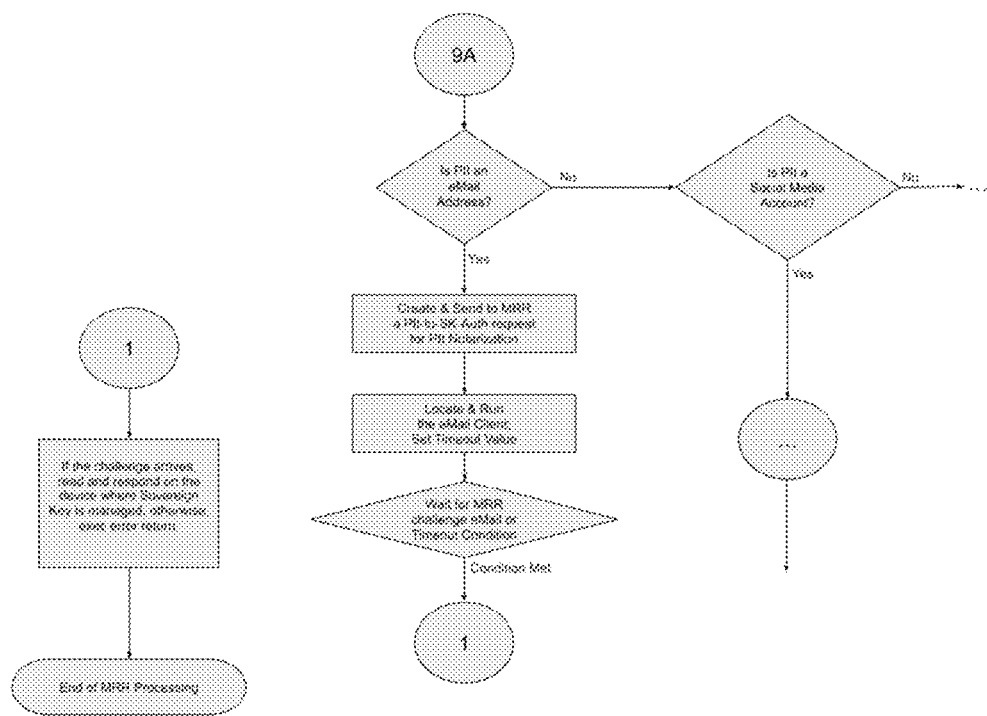
Figure 9B:
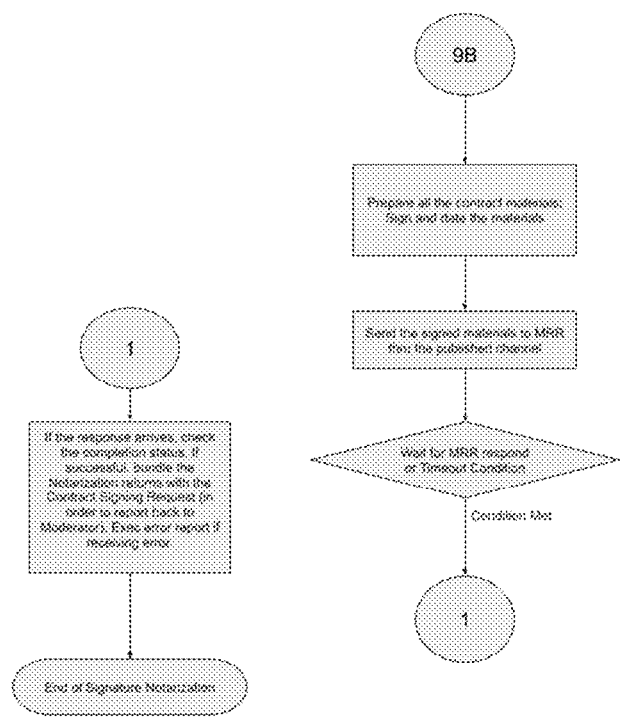

In FIGS. 9, 9A, and 9B, an example request to MRR for authenticating the PII associated with a user, represented by the associated identity key is illustrated. The MRR publishes all its public key parts of its sovereign keys (such as its SSL Certificate) at its various sites.

PII-to-SK-Auth is to request MRR to deliver this challenge to the specified PII Endpoint. This request is delivered to MRR confidentially (e.g. thru TLS, like all other requests or responses, which is not necessarily returned through the same request TLS session) through any of its published channels (email, IM, . . . ), which need not be of the same type as the target PII Endpoint type or the same PII Endpoint type where the request is delivered. MRR, in response to the request, issues a PII-to-SK-Auth-challenge to the target PII endpoint. If the challenge is to be against a phone or SMS, there are no technical issues for MRR to carry out the multi-factor challenges as they are quite frequently done by conventional service providers. MRR just needs to provide the final archival services when successfully completed. The email addresses are a common PII endpoint for the MRR to challenge. For other challenges that incur special textual or graphical interactions, such as various kinds of IM services, SMS, Facebook, Twitter, etc., that establish the PII of the Contract Group members, it implies additional details for interacting with those services. Anyone capable of reading the content carried with the challenge through electronic or other means is functionally considered the owner of the PII.

A special kind of Authentication Request outlined above is the notarization request for a set of documents from a requester who may not be fully identified (in terms of its association with any PII) and digitally is only represented through their Identity Key. The Response Data in this Notarization process is a collection of contract material, including all those items in FIG. 3A, 3B, all attached documents (if email is used for exchanging messages), and all materials requested as in FIG. 4, which outlines all the signature data each member of the contract group must oblige based on their roles in the negotiation process. For each of the listed PII items in FIG. 3A, its association with the corresponding Identity Key must be notarized based on the rules of this Process.

For the PII-to-SK-Auth-challenge when the target object is the Identity Key kind, the response data may be a complete collection of all the contract materials, supporting attachments and all collected authentication data, digitally encrypted and signed by the target Identity Key. When the size of the response data becomes an issue, a cryptographic hash may be sufficient as long as the original materials are collected and archived by the Contract Group itself (most likely managed through the Moderator).

All the challenges and response details, conducted by MRR, are collected and archived by MRR in its transaction repositories, which may be retrieved and examined by its subscribers when requested.

When the PII Section of a Contract Endpoint involves multiple PII Entries, there may be needs for authenticating multiple of those entries. They are especially evident when the Contract Endpoint is anonymized, inherently a multi-factor situation. However, those needs are not exactly the same as the popular multi-factor authentication frequently employed by third-party service providers for authenticating their subscribing accounts. The conventional service-provider-initiated multi-factor authentication is to lessen the risk of erroneous or malicious user logins, where individual factors may not have sufficient security strength and/or are prone to brute-force attacks. The primary objective is to prevent the unwarranted access to resources managed by the service providers for specific user accounts. On the other hand, the authentication under the present technology, involving the MRR service, is designed to authenticate the Contract Endpoints, each of which is equipped with a PKC key pair of considerably stronger security strength than passwords, and to prove their associations with individual PII entries in their respective PII Sections. It is highly useful for situations where those Contract Endpoints are anonymized. It also provides multi-factor authentication self-conducted by members of the contracting group.

Concerns of ease of use also tend to suppress the strength of those factors in traditional account authentication. Embedding "cookies" with the clients in those account authentications may reduce the frequency utilized for authenticating the account, nevertheless that process can be performed sufficiently frequently in order to avoid account compromises. The account authentication by the service provider or a third party can be carried out individually for each account involved and is not transferable among user sessions. In contrast, the MRR based authentication generates evidentiary materials which render strong and concrete proof of identities for those targeted Contract Endpoints. By involving the disinterested and impartial MRR services, any one of the Contract Parties can initiate the authentication process aimed at a given target endpoint. The generated PII evidence for the endpoints can be simply attached to the final contract for establishing their association with those relevant PII Entries.

Furthermore, those multiple factors in the traditional account authentication scheme calling for multi-factor verification are usually independent in order to enhance the strength against identity theft. Their implementations typically enable the users to regurgitate a secret code or string of manageable length by the account owners responding to the "secret code" issued by the service provider. On the other hand, the challenges of the authentication process may be of arbitrary strength as long as it is readable by the program running at the target Contract Endpoint, which is not limited by the length of the challenge strings. The emphasis focuses on the shared ownership of those identifying factors and not on the ease of use, since the target Contract Endpoint typically runs on a fairly capable device (e.g. a smart phone capable of reading QR codes) for carrying out sophisticated authentication logic.

Note that the authentication process involving MRR described above applies to those PII Entries that are the endpoints of some well-defined transport. For PII Entries like Social Security Number, Passport number, Driver License number, etc., which are not easily verifiable directly by the transport endpoints, the present technology offers the capability of audio/video recording for communicating the authenticity of those non-transport-endpoint PII Entries. This is part of the benefits of an end-to-end agreement/contract negotiation process where each party is involved and capable of verifying the authenticity of various identity/identifying papers personally. This is actually quite common when signing up with a bank or financial institution (or a cryptocurrency exchange) when a stringent KYC protocol is to be satisfied, such as the request to the users to submit a photo in the posture of holding up a passport or driver license.

This aspect of the negotiation can be fairly complicated to implement for a service-provider-mediated process. Furthermore, the service provider can authenticate a remote party through certified public record, whereas a private party may take advantage of the rich personal or historical data regarding a remote peer for authentication purposes.

The account-based authentication by a traditional service provider typically relies on the mechanism of passwords for authentication. The PKC is sometimes used to interface with hardware tokens embedded with built-in PKC key pairs, the public key of which can be first registered with the service provider beforehand in order to correctly operate. This PKC scheme enables the service provider to be trusted in protecting the user's privacy, which unfortunately is subject to various kinds of cyber attacks and database compromises. On the other hand, the present method adopts a foundational Session Service that binds the account to the identity key pair through a database built upon a selected cryptocurrency blockchain (currently embodied in that of the Stellar Network). Additionally, this blockchain based binding is monitorable by the users owning the proper identity key pairs themselves. An identity key pair of a contract participant, verified through the TOFU initially, may not change during the contract negotiation process. Any discrepancies may be discovered by checking the key-pair/endpoint binding against the immutable blockchain. This self-initiated monitoring against unwarranted modifications to the immutable binding database is sorely missing in the PKC hardware/software identity token.

Without a third-party service provider directly involved in the contract negotiation as a mediator and a service for authenticating various parties in the Contract Group, which typically also provides file storage for the final contract with all signatures, each Contract Participant adopting the present technology can make their own independent arrangement for archiving the final contract. A confirmed delivery is assured by the Moderator before concluding the contract negotiation such that all participants are guaranteed to receive a copy of the final contract and free to decide how it is to be maintained.

A provider-less and trust-less record retention arrangement can be implemented as an option offered by the present technology. This record retention method is based on an open-source blockchain such as Stellar (https://www.stellar.org) that allows attaching data to accounts. At the end of contract negotiation, if agreed by all participating parties, the Moderator creates a Stellar account (optionally from the Moderators' PKC Wallet) and attaches the encrypted final contract to the account (as a name/value pair). All participants are given the decryption key before the contract negotiation is successfully concluded. Typically what is to be published on the blockchain is the hash value of the contract, with the actual content stored with some public storage providers such as those IPFS providers. This method is close to the operations in accessing the popular NFT tokens under Ethereum (https://ethereum.org) without creating NFT tokens or transaction support.

This approach in record retention has the added advantage of using the blockchain as the provider of timestamps, which reduces the dependency on TSA (Time Stamp Authority).

A "fat client", as hinted previously, is implemented to help manage the Signal sessions and interface with the chosen email servers. After the sessions have been created, the messages within the various sessions are mostly passed through their email endpoints. When transported under the email protocols, the message content is in the format of text strings encapsulated in the MIME format as outlined in FIG. 5, with the exposed content 510, 520, 530 either adopted from a boilerplate text or drafted by the users themselves. The actual message content is enclosed by a special media type, aifi-contract-encrypted, and delivered encrypted as an attachment to the email. The actual encrypted data embedded in the email attachment is another MIME-formatted document nested within the indecipherable outer layer, with content outlined in 520 of FIG. 5. The method-specific X-header is to assist the processing, which is meaningful to the current method. Note that as long as the "From:" and "To:" endpoint addresses are anonymized and the messages are anonymously routed through the anonymity network like Tor, the communications in the present method are completely void of any recognizable PII and metadata.

The logic flow of all functions are structured based on the method-specific X-headers. Other than the Authentication Message Loop involving MRR described previously, the rest of the logic is fairly straightforward, much like the traditional in-person negotiation and contract signing with all parties facing each other directly without involving third party service providers. An exemplary embodiment may structure the handling of a function as a message subsystem (or a thread of execution handling specific types of messages) which is fed with specific types of messages for that specific function.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, by a client device of a user and from an application server, a software component to install on the client device, the software component enabling the client to communicate with other client devices involved in a document-review event;
generating, by the client device, an identity key based on a public/private key pair derived from a Public Key Cryptography (PKC) algorithm, to be associated with the user in the document-review event;
defining, by the client device, one or more personally identifiable information (PII) of the user, to be associated with the generated identity key;
authenticating, initiated by the client device, one or more defined PII, by communicating with one or more message registration relay services (MRR) to start an authentication challenge/response process, without revealing the public key of the client and any of its defined personal identifiable information;

obtaining, by the client device, an authentication receipt from MRR, digitally signed by MRR indicating a successful completion of the authentication challenge process;

assigning, by the user to the client device, one or more other participants to be involved in the document-review event based on their public key and one or more of their respective PII, determining, by the client device, a message delivery transport for the document-review event to each of the other participants; and communicating, by the client device and to each corresponding client device of the other participants of the document-review event, the public key, the defined PII associated with the identity key, and the MRR authentication receipts for the client device for each of the PII.

2. The computer-implemented method of claim 1, further comprising:
for each of the one or more other participants:
communicating, by the client device and to each corresponding client device of the other participant, one or more document drafts associated with the document-review event with signatures of the user based on the associated identity key, through the determined message delivery transport;
collecting, by the client device and from each of the corresponding client devices of the other participant, document drafts associated with the document-review event with the signatures of the other participant involved in the document-review event; and
recording, by the client device, the documents and signatures involved in the document-review event indicating completion of the document-review event.

3. The computer-implemented method of claim 1, wherein the message delivery transport comprises at least one of an email, instant messenger, social media, phone and/or SMS, audio/video conferencing, a social security number, and a residence address.

4. The computer-implemented method of claim 1, wherein each of the one or more other participants is authenticated by the client device using the PKC based on the identity key pairs private to the document-review event.

5. The computer-implemented method of claim 1, comprising verifying, by the client device, one or more signatures and/or the MRR authentication receipts of the corresponding client devices of the other participants in the document-review event based on their respective identity keys.

6. The computer-implemented method of claim 1, comprising recording the involved documents and signatures on a blockchain.

7. The computer-implemented method of claim 1, wherein the document-review event comprises a contract negotiation.

8. A non-transitory computer-readable medium storing software comprising instructions executable by one or more computers which, upon such execution, cause the one or more computers to perform operations comprising:
receiving, by a client device of a user and from an application server, a software component to install on the client device, the software component enabling the client to communicate with other client devices involved in a document-review event;
generating, by the client device, an identity key based on a public/private key pair derived from a Public Key Cryptography (PKC) algorithm, to be associated with the user in the document-review event;

defining, by the client device, one or more personally identifiable information (PII) of the user, to be associated with the generated identity key;

authenticating, initiated by the client device, one or more defined PII, by communicating with one or more message registration relay services (MRR) to start an authentication challenge/response process, without revealing the public key of the client and any of its defined personal identifiable information;

obtaining, by the client device, an authentication receipt from MRR, digitally signed by MRR indicating a successful completion of the authentication challenge process;

assigning, by the user to the client device, one or more other participants to be involved in the document-review event based on their public key and one or more of their respective PII, determining, by the client device, a message delivery transport for the document-review event to each of the other participants; and communicating, by the client device and to each corresponding client device of the other participants of the document-review event, the public key, the defined PII associated with the identity key, and the MRR authentication receipts for the client device for each of the PII.

9. The non-transitory computer-readable medium of claim 8, further comprising:
for each of the one or more other participants:
communicating, by the client device and to each corresponding client device of the other participant, one or more document drafts associated with the document-review event with signatures of the user based on the associated identity key, through the determined message delivery transport;
collecting, by the client device and from each of the corresponding client devices of the other participant, document drafts associated with the document-review event with the signatures of the other participant involved in the document-review event; and
recording, by the client device, the documents and signatures involved in the document-review event indicating completion of the document-review event.

10. The non-transitory computer-readable medium of claim 8, wherein the message delivery transport comprises at least one of an email, instant messenger, social media, phone and/or SMS, audio/video conferencing, a social security number, and a residence address.

11. The non-transitory computer-readable medium of claim 8, wherein each of the one or more other participants is authenticated by the client device using the PKC based on the identity key pairs private to the document-review event.

12. The non-transitory computer-readable medium of claim 8, comprising verifying, by the client device, of one or more signatures and/or the MRR authentication receipts of the corresponding client devices of the other participants in the document-review event based on their respective identity keys.

13. The non-transitory computer-readable medium of claim 8, comprising recording the involved documents and signatures on a blockchain.

14. The non-transitory computer-readable medium of claim 8, wherein the document-review event comprises a contract negotiation.

* * * * *